US009826175B2

(12) United States Patent
Isobe

(10) Patent No.: US 9,826,175 B2
(45) Date of Patent: Nov. 21, 2017

(54) IMAGE PICKUP APPARATUS AND PHOTOGRAPHING APPARATUS INCLUDING THE SAME

(71) Applicant: CANON KABUSHIKI KAISHA, Tokyo (JP)

(72) Inventor: Shingo Isobe, Saitama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 2 days.

(21) Appl. No.: 14/608,627

(22) Filed: Jan. 29, 2015

(65) Prior Publication Data

US 2015/0222827 A1 Aug. 6, 2015

(30) Foreign Application Priority Data

Jan. 31, 2014 (JP) ................................ 2014-017341

(51) Int. Cl.
*H04N 5/353* (2011.01)
*H04N 5/345* (2011.01)

(52) U.S. Cl.
CPC ......... *H04N 5/3532* (2013.01); *H04N 5/3456* (2013.01)

(58) Field of Classification Search
CPC ........................................ H04N 5/345–5/3456
See application file for complete search history.

(56) References Cited

U.S. PATENT DOCUMENTS 6,084,634 A 7/2000 Inagaki et al.
7,154,542 B1 12/2006 Yuki et al.
8,934,037 B2 1/2015 Suzuki
2003/0025815 A1 2/2003 Hashimoto
2005/0219368 A1 10/2005 Kobayashi
2008/0291306 A1 11/2008 Totori
(Continued)

FOREIGN PATENT DOCUMENTS

JP 2001078081 A 3/2001
JP 2005277709 A 10/2005
(Continued)

OTHER PUBLICATIONS

Office Action issued in U.S. Appl. No. 14/608,682 mailed Apr. 29, 2016.

(Continued)

*Primary Examiner* — Christopher K Peterson
(74) *Attorney, Agent, or Firm* — Rossi, Kimms & McDowell LLP

(57) ABSTRACT

Provided is an image pickup apparatus capable of reading out and outputting pixel data of a partial area of a rolling shutter type image sensor. The image pickup apparatus includes: a readout condition setter setting a readout condition for pixel data readout control from the image sensor; a charge time setter setting charge time of the image sensor; a skip setter setting, based on the readout condition, areas in which processing concerning one of readout and charge in an image pickup area of the image sensor is skipped; a controller controlling a charge of the image sensor and readout from the image sensor so as to achieve constant charge time of the image sensor within one frame based on the charge time and the areas set by the skip setter; and an image signal output unit outputting a pixel signal read out by the controller.

28 Claims, 14 Drawing Sheets

(56) References Cited

U.S. PATENT DOCUMENTS

| | | | | |
|---|---|---|---|---|
| 2009/0021621 | A1* | 1/2009 | Hashimoto .......... | H04N 5/3456 348/300 |
| 2009/0180014 | A1 | 7/2009 | Noda et al. | |
| 2010/0134667 | A1 | 6/2010 | Suzuki et al. | |
| 2011/0267533 | A1 | 11/2011 | Hirose | |
| 2011/0317039 | A1 | 12/2011 | Ise | |
| 2013/0001404 | A1 | 1/2013 | Meynants | |
| 2013/0063653 | A1 | 3/2013 | Kita | |
| 2013/0112851 | A1 | 5/2013 | Ihori et al. | |
| 2013/0271631 | A1 | 10/2013 | Tatsuzawa et al. | |
| 2015/0189201 | A1 | 7/2015 | Bridges | |
| 2015/0358571 | A1 | 12/2015 | Dominguez Castro et al. | |

FOREIGN PATENT DOCUMENTS

| | | | |
|---|---|---|---|
| JP | 2007173986 | A | 7/2007 |
| JP | 2010130398 | A | 6/2010 |
| JP | 2010181751 | A | 8/2010 |
| JP | 2010271379 | A | 12/2010 |
| JP | 4757013 | B2 | 8/2011 |
| JP | 2013183319 | A | 9/2013 |

OTHER PUBLICATIONS

Office Action issued in U.S. Appl. No. 14/608,682, mailed Oct. 27, 2016.

Notice of Allowance issued in U.S. Appl. No. 14/608,682 mailed Jan. 6, 2017.

Office Action issued in U.S. Appl. No. 14/608,682 dated Jun. 12, 2017.

* cited by examiner

IMAGE PICKUP APPARATUS AND PHOTOGRAPHING APPARATUS INCLUDING THE SAME

BACKGROUND OF THE INVENTION

Field of the Invention

The present invention relates to an image pickup apparatus, and more particularly, to an image pickup apparatus having a partial readout function or a skip readout function, and a photographing apparatus including the same.

Description of the Related Art

At a factory manufacturing line, an image pickup apparatus for inputting images has come to be used in place of visual inspection conducted by a human inspector. Such an image pickup apparatus is also referred to as a machine vision camera, and used for inspecting various types of components or products with a computer or a digital input/output device. In recent years, in order to improve inspection accuracy, an image pickup apparatus having ten million or more pixels has come to be used. Similarly, in a consumer digital camera, the number of pixels is increasing more and more in order to improve captured image quality.

With the increasing needs for a greater number of pixels and higher image quality, in recent years, as an image pickup element to be used for a camera, a complementary metal-oxide semiconductor (CMOS) sensor of a rolling shutter type is widely used. In the rolling shutter type, lines of image pickup elements are sequentially exposed. Thus, exposure time for carrying out exposure by a sensor is also set by a line unit.

When a moving image is captured by such an image pickup apparatus and a signal is read out from all pixels of a pixel array, readout time is longer as the number of pixels is larger. Consequently, in the case of moving image capturing, the number of captured images per second is reduced. Further, a data amount for outputting a captured video to the outside becomes greater, and thus a fame rate decreases. For example, in the machine vision camera, total readout time changes with the number of pixels for imaging, and the frame rate changes with the number of pixels output to the outside of the image pickup apparatus.

In an inspection system using the machine vision camera, shortening of inspection time is simultaneously demanded. Accordingly, the number of readout pixels is reduced by reading out a pixel signal from only an interest area among those in which images are captured by the camera, thereby increasing a frame rate. When the frame rate can be increased, the inspection time of the entire system can be shortened.

In the rolling shutter type, charge processing for photoelectric conversion and readout processing of a photoelectrically converted signal are closely linked with each other. For example, when total readout time is shortened by selecting the interest area, charge time in a partial area of the sensor may change. At this time, exposure time is not uniform over the entire area of the sensor, and thus uneven luminance may occur.

Thus, in Japanese Patent No. 4757013, there is disclosed an example where when charge time varies from line to line in a photographing sequence of one image, a luminance difference generated due to the difference in charge time is corrected by a correction value. According to Japanese Patent No. 4757013, a luminance gap generated between lines due to line skipping can be reduced.

Japanese Patent Application Laid-Open No. 2010-130398 discloses a problem in that image quality is deteriorated when a NULL area and an OB area of an image sensor are skipped during skipping readout. A black level of a captured image is determined based on an image pickup signal of the OB area. Accordingly, when the OB area is skipped, accuracy of the black level may be reduced. Thus, according to Japanese Patent Application Laid-Open No. 2010-130398, image quality deterioration is reduced by reading out the OB area while skipping the NULL area during readout of the image pickup signal.

Under specific photographing conditions, the correction based on the correction value or an offset unit disclosed in Japanese Patent No. 4757013 may be effective. However, a great volume of correction values need to be stored in order to deal with various photographing scenes. When such correction processing is carried out as post-processing after photographing, image quality may drop.

The technology disclosed in Japanese Patent Application Laid-Open No. 2010-130398 is effective for photographing in the case of long exposure of the rolling shutter. However, when a high-speed shutter is used, a difference in exposure time is generated between lines, causing uneven luminance.

In a camera used for inspection, exposure time to be set varies, and there are various skip setting values depending on needs. In addition, in the camera used for inspection, a high-quality and high-definition captured image is required. To maintain optimal image quality, in a photographing sequence of one image, or between frames during moving image capturing, it is desired that all the areas of the image sensor be exposed for the same exposure time.

SUMMARY OF THE INVENTION

The present invention provides an image pickup apparatus including a rolling shutter type image sensor and capable of dealing with variously set exposure time and skipping readout and of reducing uneven luminance, and a photographing apparatus including the image pickup apparatus.

According to one embodiment of the present invention, there is provided an image pickup apparatus capable of reading out and outputting pixel data of a partial area of a rolling shutter type image sensor, the image pickup apparatus including: a readout condition setter configured to set a readout condition for pixel data readout control from the image sensor; a charge time setter configured to set charge time of the image sensor; a skip setter configured to set, based on the readout condition, areas in which processing concerning one of readout and charging in an image pickup area of the image sensor is skipped; a controller configured to control charging and readout of the image sensor so as to achieve constant charge time of the image sensor within one frame (within one screen) based on the charge time and the areas set by the skip setter; and an image signal output unit configured to output a pixel signal read out by the controller.

According to one embodiment of the present invention, it is possible to provide the image pickup apparatus capable of maintaining exposure even when setting of the interest area is changed and reducing image quality deterioration accompanying the setting change of the interest area, and the photographing apparatus including the image pickup apparatus.

Further features of the present invention will become apparent from the following description of exemplary embodiments with reference to the attached drawings.

DESCRIPTION OF THE EMBODIMENTS

Figure 1:
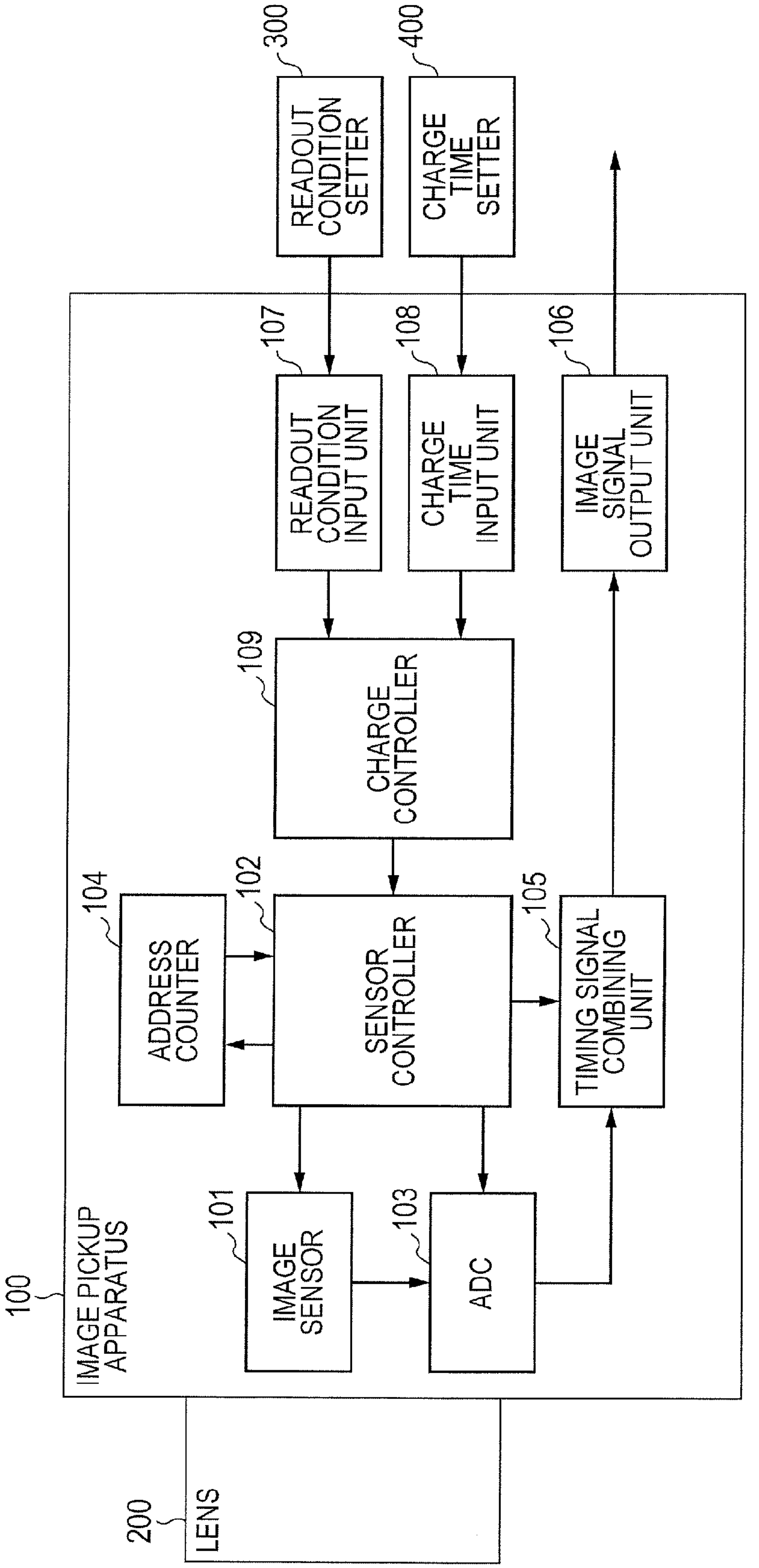
FIG. 1 is a diagram illustrating a configuration of an image pickup apparatus according to a first exemplary embodiment of the present invention.

Hereinafter, exemplary embodiments of the present invention are described in detail with reference to the accompanying drawings. FIG. 1 is a configuration diagram according to an exemplary embodiment of the present invention.

First Exemplary Embodiment

FIG. 1 illustrates a configuration of an image pickup apparatus according to a first exemplary embodiment of the present invention.

An image pickup apparatus 100 includes an image pickup system including an image sensor 101, and carries out image pickup processing by a sensor controller 102, an analog/digital converter (ADC) 103, and an address counter 104. A lens 200 is configured outside the image pickup apparatus 100, and the image pickup apparatus 100 and the lens 200 serve as a photographing apparatus. A light flux that has passed through the lens 200 forms an image on the image sensor 101 of the image pickup apparatus 100. The lens 200 includes such elements as a diaphragm unit, a zooming lens unit, and a focus lens unit (not shown). The zooming lens unit included in the lens 200 may have a variable or fixed focal length. The sensor controller 102 controls a charge operation or a readout operation of the image sensor 101. When image pickup processing of the image sensor 101 is carried out by the sensor controller 102, an image pickup signal is output from the image sensor 101, and subjected to AD conversion at the ADC 103. The address counter (skip setter) 104 calculates an address that is an object line or an object pixel of the image sensor 101 subjected to charge control or readout control by the sensor controller 102. When skipping readout is carried out from the image sensor 101, among all pixels of the image sensor 101, addresses of pixels to be read out are output as object pixels, while addresses of pixels not to be read out are skipped. A timing signal combining unit 105 inputs image pickup signal data from the ADC 103 and a signal from the address counter 104 via the sensor controller 102, and produces a frame synchronous signal, a vertical synchronous signal, or a horizontal synchronous signal with the image pickup signal data.

As a condition for pixel data readout control from the image sensor, a readout condition setter 300 sets coordinate data of area that is an interest area (readout area) or sets the number of lines of a skip unit from the outside of the image pickup apparatus 100. The number of lines of a skip unit is described in detail below. For example, a personal computer (PC) is used as the readout condition setter 300. A readout condition input unit 107 inputs and stores setting data input by the readout condition setter 300.

A charge time setter 400 sets charge time as a shutter speed of the image pickup apparatus 100 from the outside of the image pickup apparatus 100. For example, a PC is used as the charge time setter 400. A charge time input unit 108 stores a range setting value for charging or reading out all the pixels of the image sensor 101. The readout condition setter 300 and the charge time setter 400 may be configured in the same PC. The charge time described herein is charge time of each pixel in the image sensor, or charge time of each line in the image sensor. The present invention aims to set those charge time to be uniform (error within 1%) within each frame.

A charge controller 109 inputs the setting data from the readout condition input unit 107 and the charge time input unit 108. The charge controller 109 outputs the readout setting data stored in the readout condition input unit 107 to the address counter 104 via the sensor controller 102.

An image signal output unit 106 adds, in order to set correspondence in coordinates between the readout area input by the readout condition input unit 107 and each interest area of the image pickup signal, a necessary timing signal in the image pickup signal data output from the timing signal combining unit 105, and generates an output image signal. The image signal output unit 106 outputs the output image signal generated by the timing signal combining unit 105 to the outside of the image pickup apparatus 100.

Figure 2:
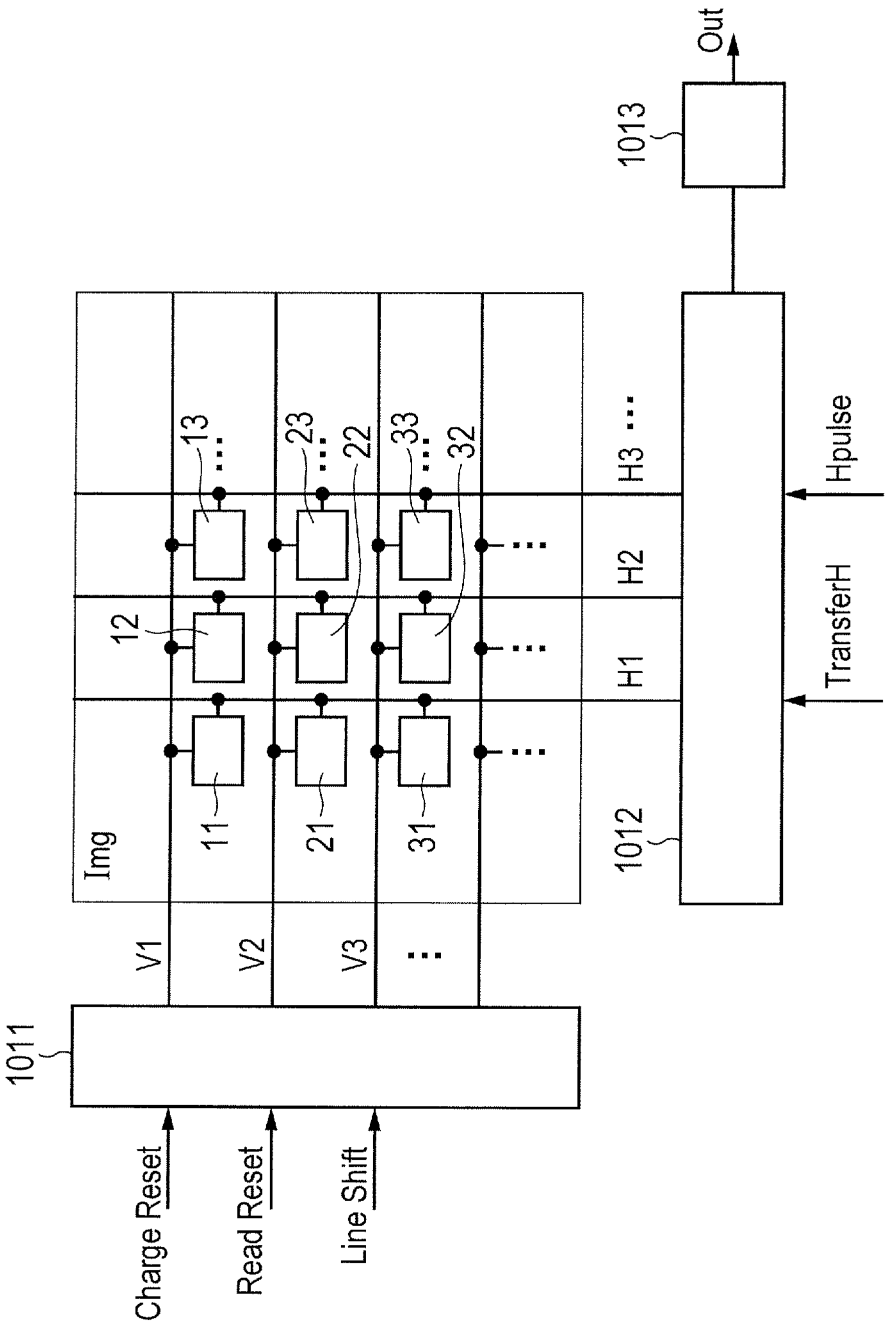
FIG. 2 is a diagram illustrating a structure of an image sensor included in the image pickup apparatus according to the first exemplary embodiment.

FIG. 2 illustrates a structure of the image sensor 101. In FIG. 2, the image sensor 101 includes an image pickup element Img, and parts 11 to 33 of a pixel array are included in the image pickup element Img. A vertical circuit 1011 and a horizontal circuit 1012 are connected to each of the pixels within an image pickup area in the image pickup element Img through V1, V2, V3, . . . H1, H2, and H3.

Three control lines ChargeReset, ReadReset, and LineShift are connected to the vertical circuit 1011 illustrated in FIG. 2. Those control lines are connected to the sensor controller 102 illustrated in FIG. 1. The vertical circuit 1011 includes a charge line selection register and a readout object line selection register (not shown). The line selection registers can select a charge object line and a readout object line in the image pickup element Img respectively. Through the control line ChargeReset, the charge object line selected by each line selection register is reset as a head line, and charging of the head line is started. Through the control line ReadReset, the readout object line selected by the line selection register is reset as a head line. The control line LineShift is a control line for incrementing the charge object line and the readout object line selected by the line selection registers. When a Hi signal is input to the control line LineShift once, a line next to the object line selected by each line selection register is referred to. This exemplary embodiment is described by way of example where the number of control lines LineShift is one. However, the control lines LineShift may be separately configured to individually increment lines that are referred to by the charge line selection register and the readout object line selection register.

Two control lines TransferH and Hpulse are connected to the horizontal circuit 1012 illustrated in FIG. 2. As in the case of the vertical circuit 1011, those control lines are connected to the sensor controller 102 illustrated in FIG. 1. After a one-shot pulse has been input to the control line LineShift, through the control line TransferH, pixel data of the readout object line selected by the line selection register of the vertical circuit 1011 is transferred to the horizontal circuit 1012. For example, when the readout object line selected by the line selection register is at V2, image pickup signals 21 to 23 are transferred to the horizontal circuit 1012 through the control line TransferH. The control line Hpulse is a control line for reading out the image pickup signals transferred to the horizontal circuit 1012. When a pulse for readout control is input to the control line Hpulse, an analog image pickup signal is output from Out through an amplifier 1013 illustrated in FIG. 2. This image pickup signal is connected to the ADC 103 illustrated in FIG. 1. The ADC 103 subjects the input image pickup signal to AD conversion in synchronization with the control line Hpulse. Through the control line Hpulse, clocks are generated corresponding to the number of readout pixels.

Figure 3:
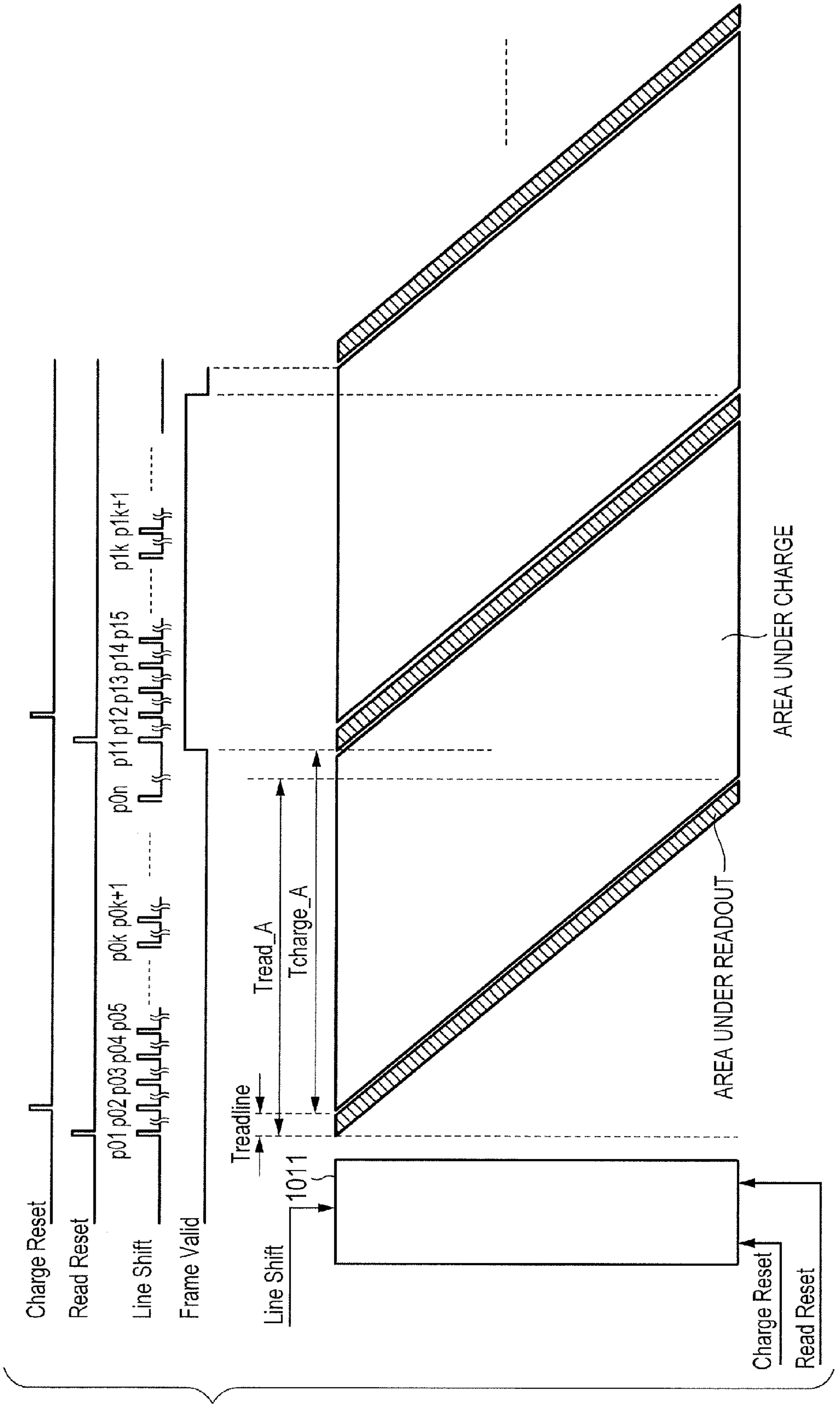
FIG. 3 is a diagram illustrating an example of image pickup control in the image pickup apparatus according to the first exemplary embodiment.
Figure 4:
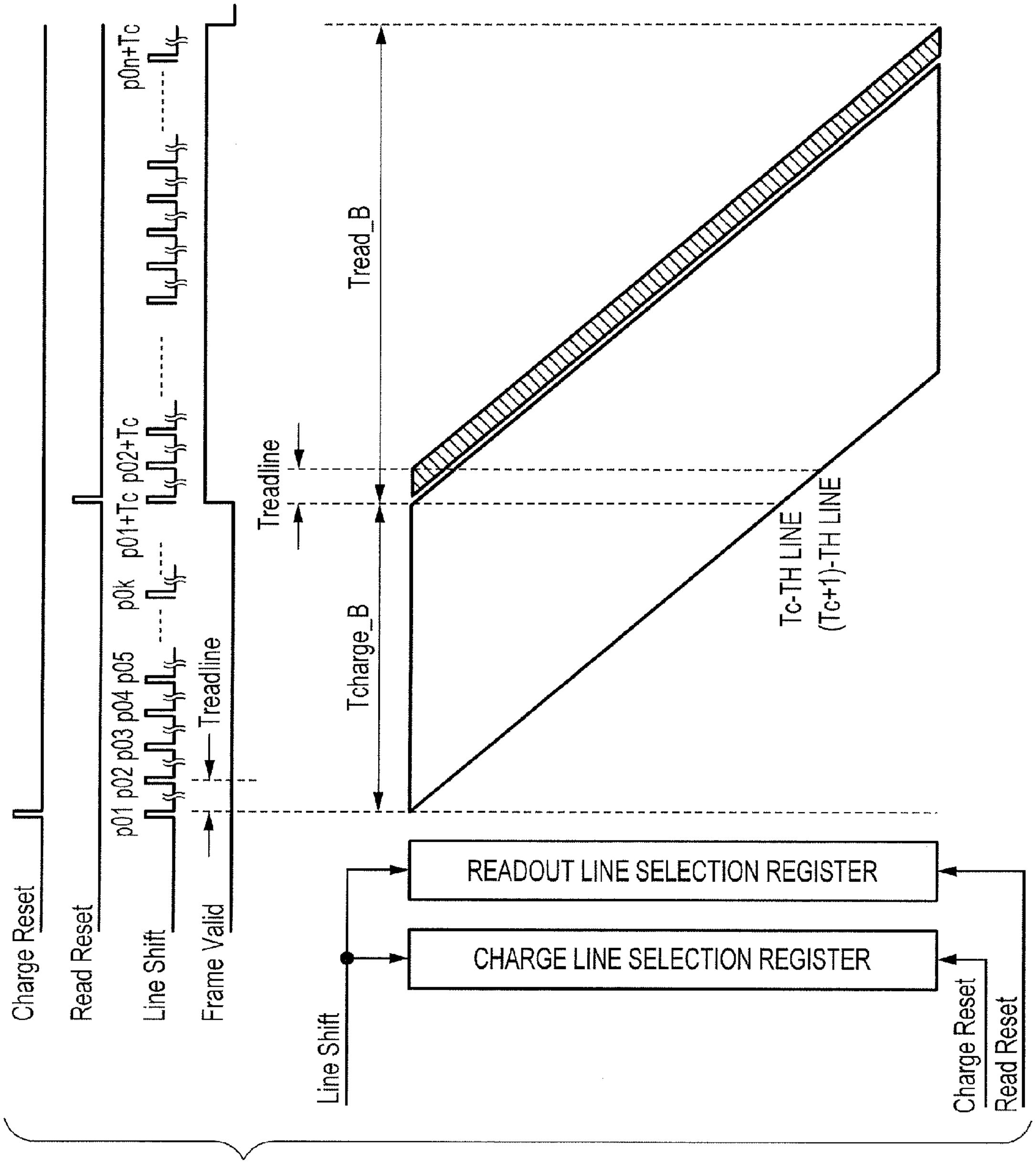
FIG. 4 is a diagram illustrating an example of image pickup control in the image pickup apparatus according to the first exemplary embodiment.

An example of the image pickup control of the image sensor 101 is described referring to FIGS. 3 and 4. The image sensor 101 is a rolling shutter type image sensor. In the example, the number of readout object lines of the image sensor 101 is n. As described below, readout time of n lines as the readout object is compared with charge time per line, and two types of image pickup control are switched based on a size relationship thereof. FIG. 3 illustrates an example in which the charge time per line is equal to or longer than the readout time of the n lines.

FIG. 3 illustrates connection of the control lines ChargeReset, ReadReset, and LineShift to the vertical circuit 1011, and a timing chart in the upper part. In FIG. 3, a horizontal axis indicates a time direction. A vertical axis in the lower part illustrated in FIG. 3 indicates a charge/readout image in a line direction of the image sensor 101. When pulses are input to the control lines ReadReset and LineShift at a time p01, a first line of the image sensor 101 is started to be read out. After the input of the pulse to the control line LineShift at the time p01, a pixel signal of the first line is read out by using the control lines TransferH and Hpulse (not shown) of the horizontal circuit 1012 in FIG. 3. During the readout of the pixel signal, AD conversion is carried out by the ADC 103 illustrated in FIG. 1 in synchronization with the control line Hpulse. Treadline illustrated in FIG. 3 indicates time necessary for reading out a pixel signal of a single line. After readout of a single line is completed, one-shot pulses are input to the control lines LineShift and ChargeReset at a time p02. Treadline is equal to a time interval between the time p01 and the time p02. The Treadline is sufficiently longer than the Hi time of the one-shot pulse input to the control line LineShift at the time p01 or p02. In this case, by the line selection registers of the vertical circuit 1011, a second line is selected as a readout object line and a first line is selected as a charge object line. A pixel signal of the first line is read out from the time p01 to the time p02, and then charging of the first line is started at the time p02. From the time p02 to the time p03, as in the aforementioned case, a pixel signal of the second line is read out during the time of the Treadline. As indicated by "area under readout" and "area under charge", between the lines, charging and readout are carried out by a time difference equal to the Treadline time.

Thereafter, similarly, when charging and readout are carried out up to the last n-th line of the image sensor during the time from p01 to p0*n*, readout is carried out again from the first line at the time p11. At the time p11, processing is carried out, which is similar to the processing to the horizontal circuit 1012 carried out at the time p01. An image pickup signal of the first line read out at the time p11 has been charged during the time from p02 to p11. For example, an image pickup signal of the second line read out at the time p12 has been charged during the time from p03 to p12. An image pickup signal read out during the time from p01 to p0*n* is a 0th frame after camera activation, and a dummy is read out. A FrameValid signal illustrated in FIG. 3 is valid for each frame after the time p11 for reading out the image pickup signal charged at the 0th frame, that is, after the first frame, and an image pickup signal of the 0th frame read out from the time p01 to the time p0*n* is invalid.

Thus, in FIG. 3, while the 0th frame is sequentially read out from the time p01 to the time p0*n*, a charging operation is sequentially started at the first fame at the each line after the time p02. As illustrated in FIG. 3, Tread_A indicates readout time from the first line to the last n-th line. Time acquired by multiplying the Treadline by the number of lines n is Tread_A. Tcharge_A indicates charge time of the first line. In FIG. 3, the charge time Tcharge_A of the each line from the first line to the last n-th line is equal to Tcharge_A0, and thus uniform. When the Tread_A and the Tcharge_A illustrated in FIG. 3 are respectively denoted as Tread and Tcharge, a relationship between the Tcharge and the Tread illustrated in FIG. 3 is represented by Expression (1):

$$T\text{charge} \geq T\text{read} \quad (1)$$

In the case of a relationship represented by Expression (2) different from that of Expression (1), image pickup control illustrated in FIG. 4 is carried out.

$$T\text{charge} < T\text{read} \quad (2)$$

In FIG. 4, as in the case illustrated in FIG. 3, the control lines ChargeReset, ReadReset, and LineShift are connected to the vertical circuit 1011, and a timing chart is illustrated in the upper part. First, at a time p01, by inputting one-shot pulses to the control lines ChargeReset and LineShift, charging of the first line of the image sensor 101 is started. Then, at a time p02, by inputting a one-shot pulse to the control line LineShift, charging of the second line of the image sensor 101 is started. A time interval between the time p01 and the time p02 is Treadline as in the case illustrated in FIG. 3. Similarly, one-shot pulses are input to the control line LineShift at the time interval of the Treadline, that is, at p01, p02, . . . p0$k$, . . . . Thus, by inputting the one-shot pulses to the control line LineShift, charging is sequentially started while being accompanied by Treadline time shifting at the first line, the second line, . . . the k-th line, . . . . Then, when one-shot pulses are input to the control lines ReadReset and LineShift at a time p01+Tc, the charging of the first line of the image sensor 101 is ended. After the one-shot pulses have been input at the time p01+Tc, as in the case illustrated in FIG. 3, a pixel signal of the first line is read out by using the control lines TransferH and Hpulse of the horizontal circuit 1012 (not shown). In this case, an image pickup signal charged during the time from p01 to p01+Tc, that is, during charge time of Tcharge_B, is read out. Tc is a value acquired by dividing the charge time Tcharge_B per line by the Treadline. At the time p01+Tc, charging of the Tc-th line is started simultaneously with readout of the first line. Thereafter, by the same readout method as that illustrated in FIG. 3, at the time p01+Tc and thereafter, readout is sequentially carried out line by line until the n-th line that is the last line with a time difference of Treadline. Thus, time for reading out all the lines of the image sensor 101 is indicated by Tread_B. When the numbers of readout lines are equal, the Tread_B is equal to the Tread_A illustrated in FIG. 3.

Thus, the image pickup control under Expression (2) illustrated in FIG. 4 is an example of image pickup control carried out when the charge time is shorter than the readout time. At the readout start time of the first line and thereafter, charging of the Tc-th line and its following lines is started. In the case of continuous photographing, after the end of reading out all the readout object lines, charging or readout of a next frame is carried out.

Figure 5:
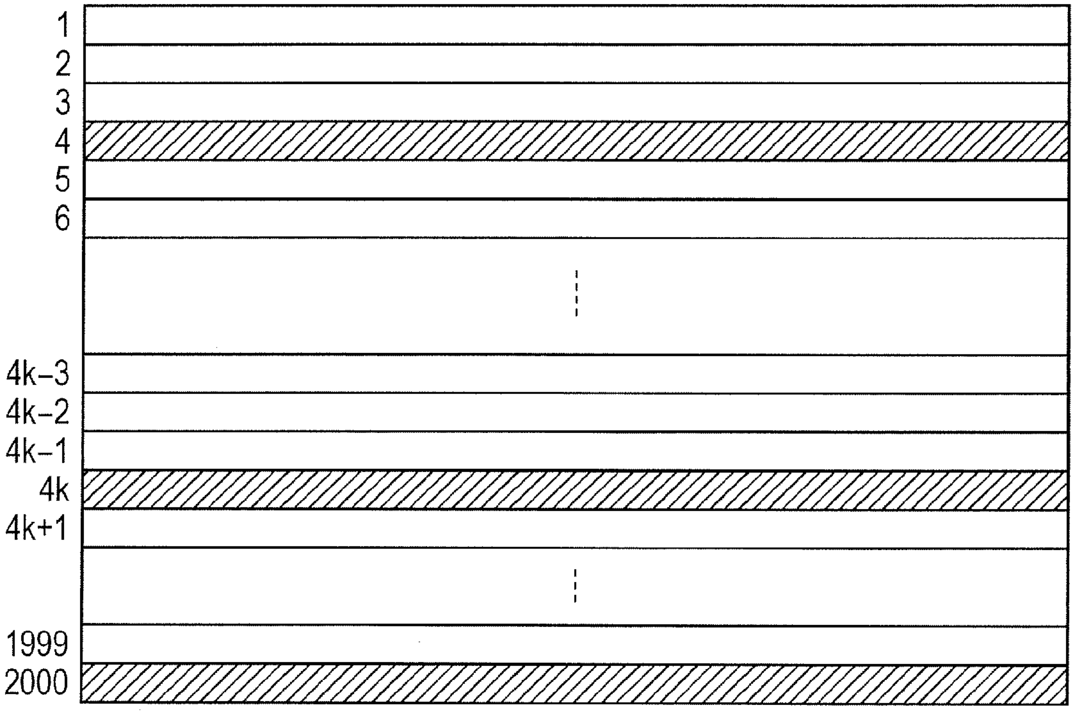
FIG. 5 is a diagram illustrating a setting example of a readout object line in an image pickup element according to the first exemplary embodiment.
Figure 6:
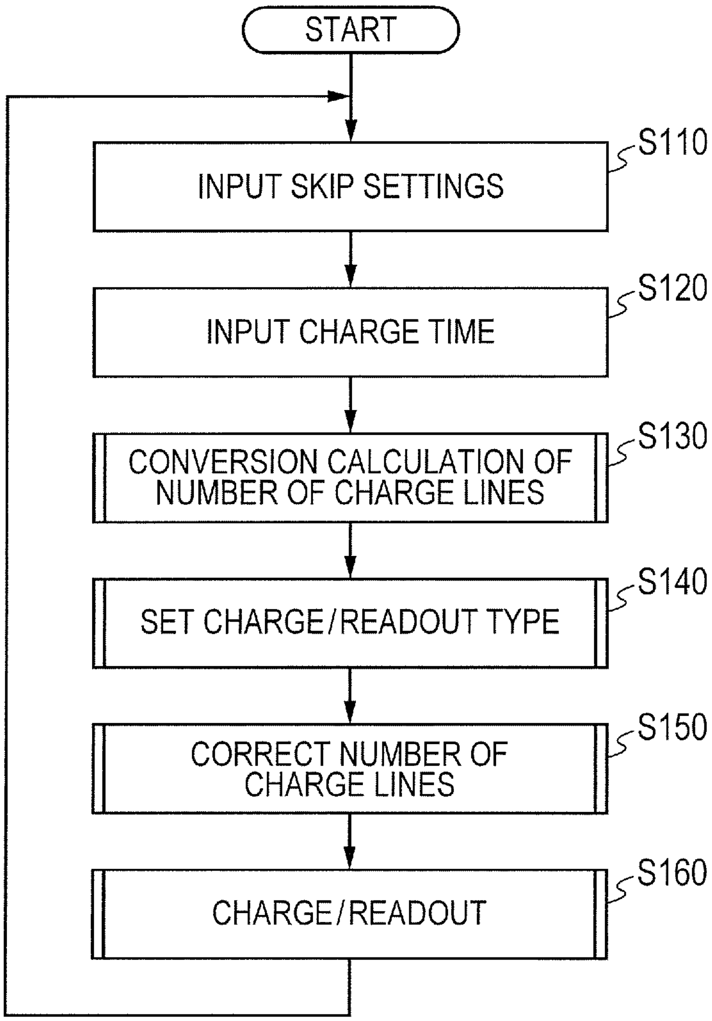
FIG. 6 is a flowchart illustrating readout processing of the image pickup apparatus according to the first exemplary embodiment.

Based on the example of the image pickup control, in this exemplary embodiment, an image pickup example of reading out and skipping an image pickup signal by a four-line unit is described. FIG. 5 illustrates an example where the image sensor 101 includes 2,000 lines of image pickup elements. In this exemplary embodiment, an example is described where exposure time is set equal between lines when 4k lines (k is natural number) indicated by shaded parts are read while (4k−1)-th, (4k−2)-th, and (4k−3)-th lines are skipped. FIG. 6 is a flowchart illustrating processing carried out by the image pickup apparatus 100 according to this exemplary embodiment. When power is turned ON for the image pickup apparatus 100, the processing is carried out in order from Step S110 illustrated in FIG. 6.

First, in Step S110 of the flowchart illustrated in FIG. 6, skip setting is input. The skip setting is input through the readout condition input unit 107 by the readout condition setter 300 illustrated in FIG. 1. In this case, a skip unit is input as a skip setting value. According to the present invention, the skip unit is defined as a unit for representing the number of lines of repeated unit patterns of readout lines and skip lines. As described above, readout and skipping are carried out by the four-line unit. Accordingly, the skip unit is "4". According to the definition of the skip unit, this means that a single line is read out and three lines are skipped. A readout setting value is stored in the readout condition input unit 107 illustrated in FIG. 1, and input to the charge controller 109. After the execution of Step S110 illustrated in FIG. 6, the processing proceeds to Step S120.

In Step S120, charge time is input as a shutter speed. In this case, the charge time is input through the charge time input unit 108 by the charge time setter 400 illustrated in FIG. 1. The charge time is stored in the charge time input unit 108 illustrated in FIG. 1, and input to the charge controller 109. The charge time is generally indicated by 1/250, 1/500, or the like, and "seconds" are used as a unit in many cases. However, "milliseconds" may be used. The charge time in the present invention is real time. After the execution of Step S120 illustrated in FIG. 6, the processing proceeds to Step S130.

Figure 7:
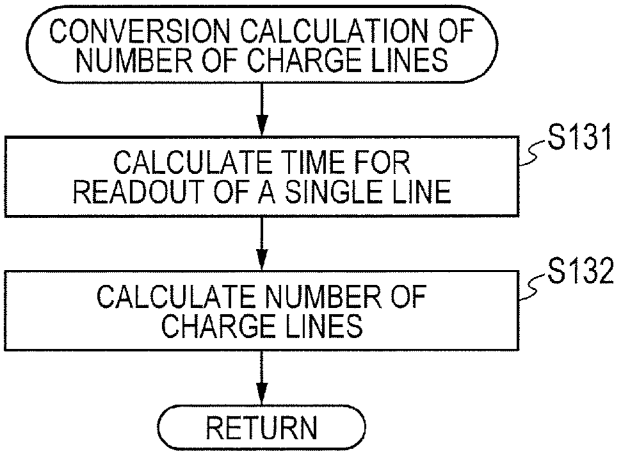
FIG. 7 is a flowchart illustrating a subroutine of Step S130 of the readout processing illustrated in FIG. 6.

In Step S130, the charge controller (count number setter) 109 calculates conversion of the number of charge lines. FIG. 7 illustrates a subroutine of Step S130 illustrated in FIG. 6. First, in Step S131 illustrated in FIG. 7, time for readout of a single line of the image sensor 101 is calculated. As described above referring to FIGS. 3 and 4, Treadline is time necessary for reading out a pixel signal of a single line. The Treadline is time acquired by adding together time from inputting one-shot pulse to the control line LineShift until transferring pixel data of a readout object line by the control line TransferH, and readout time of the control line Hpulse. The time until transferring the pixel data of the readout object line by the control line TransferH may be stored as a fixed value in advance. For the readout time of the control line Hpulse, because of dependence on the number of readout pixels per line, time is calculated by adding predetermined overhead time to time acquired by multiplying readout pulse cycle time by the number of readout pixels per line. The readout pulse cycle of the control line Hpulse may be fixed time defined according to specifications of the image sensor 101. Those fixed values may be stored in a memory (not shown) or in the sensor controller 102 or the charge controller 109 without limitation on implementing units. Returning to the flowchart illustrated in FIG. 7, after the time for reading out a single line is calculated in Step S131, the processing proceeds to Step S132.

In Step S132 illustrated in FIG. 7, the number of charge lines is calculated. The "number of charge lines" is a value calculated by dividing the charge time input in Step S120 by the readout time per line calculated in Step S131. After the charge time and the readout time per line have been provided, the charge time can be converted into a unit of the number of charge lines. Using the unit of the number of charge lines enables processing (controlling) of the charge time (shutter speed or exposure time) without any dependence on the number of readout pixels per line and the readout time. In other words, by instructing a readout start or a charge start (charge reset) and counting control pulses used for changing the object line to a next line, the readout start, the charge start, and the charge time can be controlled in synchronization. The number of charge lines is necessary to be an integer in order to use the number of charge lines for control, and a value after a decimal point may be truncated or rounded off. According to the present invention, control is carried out by using the number of charge lines (count) of the integer thus rounded as a value corresponding to the charge time input by the charge time setter 400. In view of extremely short readout time per line with respect to the charge time (shutter speed) and an interval normally settable as the charge time, the number of charge lines acquired by the rounding processing and the set charge time can be said to be values satisfactory enough for the control. After the execution of Step S132, the subroutine illustrated in FIG. 7 is ended, and the processing proceeds to Step S140 illustrated in FIG. 6.

Figure 8:
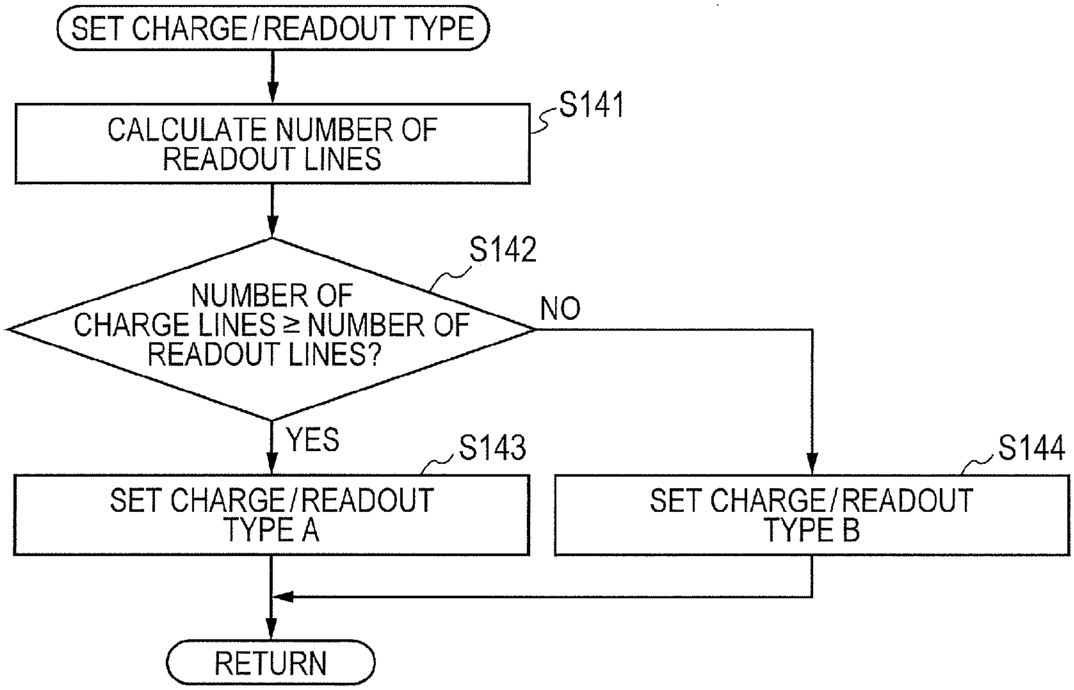
FIG. 8 is a flowchart illustrating a subroutine of Step S140 of the readout processing illustrated in FIG. 6.

In Step S140 illustrated in FIG. 6, a charge/readout type is set. FIG. 8 illustrates a subroutine of setting the charge/readout type in Step S140. First, in Step S141 illustrated in FIG. 8, the number of readout lines included in a range of an interest area (readout object) is calculated. According to this exemplary embodiment, as illustrated in FIG. 5, the readout object is 2,000 lines. Thus, in Step S141, the number of readout lines is 2,000.

After the execution of Step S141 illustrated in FIG. 8, the processing proceeds to Step S142. In Step S142, sizes are compared between the number of charge lines calculated in Step S132 and the number of readout lines calculated in Step S141. An evaluation expression in Step S142 is equivalent to Conditional Expression (1a) acquired by dividing both sides of Expression (1) by the readout time Treadline per line.

$$\text{Number of charge lines}(=T\text{charge}/\text{Treadline})\geq\text{number of readout lines}(\text{Tread}/\text{Treadline}) \quad (1a)$$

When the number of charge lines is equal to or more than the number of readout lines in Step S141, that is, the charge time is longer than the readout time in Expression (1), the determination in Step S142 is true, and the processing proceeds to Step S143. On the other hand, when the number of charge lines is less than the number of readout lines in Step S142, the processing proceeds to Step S144. The conditional expression having the false determination in Step S142 is equivalent to Conditional Expression (2a) of dividing both sides of Expression (2) by the Treadline.

$$\text{Number of charge lines}(=T\text{charge}/\text{Treadline})<\text{number of readout lines}(\text{Tread}/\text{Treadline}) \quad (2a)$$

In Step S143 illustrated in FIG. 8, a charge/readout type A is set. The charge/readout type A is similar to the charge/readout type described above referring to FIG. 3. After the end of readout from the readout object line of the image sensor, charging of the readout object line is started, and readout of a line next to the readout object line is started in the charge/readout type A. In Step S144, a charge/readout type B is set. The charge/readout type B is similar to the charge/readout type described above referring to FIG. 4. After the start of charging of the readout object line of the image sensor, the readout object line is read out from when charging of a line, which is after the number of charge lines from the readout object line, is started. After the execution of Step S143 or S144 illustrated in FIG. 8, the subroutine illustrated in FIG. 8 is ended, and the processing proceeds to Step S150 illustrated in FIG. 6.

Figure 9:
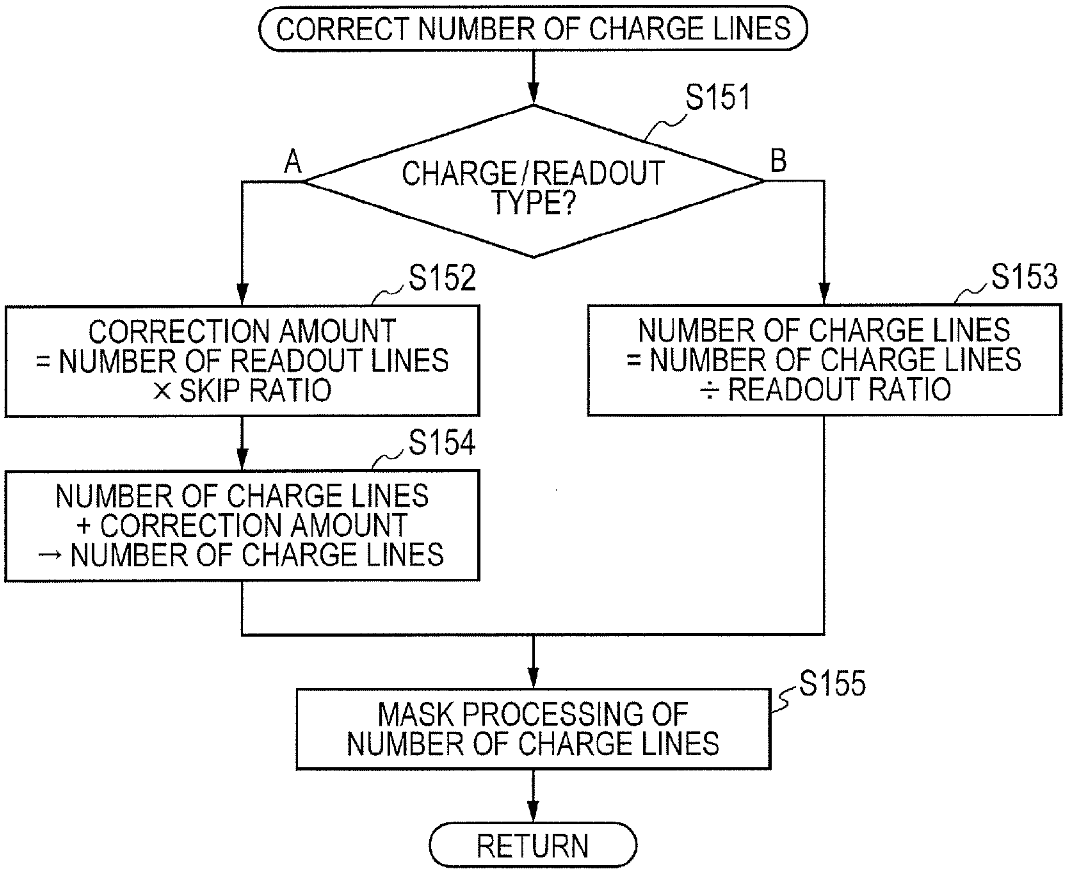
FIG. 9 is a flowchart illustrating a subroutine of Step S150 of the readout processing illustrated in FIG. 6.

In Step S150 illustrated in FIG. 6, correction processing of the number of charge lines is carried out. FIG. 9 illustrates a subroutine of Step S150. In FIG. 9, when the charge/readout type A is set in Step S151, the processing proceeds to Step S152. When the charge/readout type B is set in Step S151, the processing proceeds to Step S153.

In Step S152 illustrated in FIG. 9, as a correction amount of the number of charge lines, a value is calculated by multiplying the number of readout lines calculated in Step S141 by a skip ratio. The unit is a "line". The number of readout lines is 2,000 as illustrated in FIG. 5. The skip ratio can be calculated from the number of lines of a skip unit set in Step S110 illustrated in FIG. 6. The skip ratio is represented by Expression (3):

$$\text{Skip ratio}=1-1/\text{number of lines of a skip unit} \quad (3)$$

The number of lines of a skip unit is "4" as described above. A skip ratio is "¾". Accordingly, the correction amount set in Step S152 is calculated to be 1,500 lines by 2,000×(¾). After the execution of Step S152, the processing proceeds to Step S154. In Step S154, the correction amount is added to the number of charge lines to update the number of charge lines. For example, when the number of charge lines calculated in Step S132 illustrated in FIG. 7 is 2,000, the correction amount of 1,500 lines is added, and the number of charge lines acquired after the correction is 3,500.

In Step S153 illustrated in FIG. 9, a value is calculated by dividing the number of charge lines calculated in Step S132 by a readout ratio, and the number of charge lines is updated as the corrected number of charge lines. The readout ratio can be calculated from Expression (4) or (5). When the number of lines of a skip unit used in the description of this exemplary embodiment is "4", the readout ratio is "¼".

$$\text{Readout ratio}=1/\text{number of lines of a skip unit} \quad (4)$$

$$\text{Readout ratio}=1-\text{skip ratio} \quad (5)$$

A unit of the number of charge lines calculated in Step S153 illustrated in FIG. 9 is a "line" as in the case of Step S152. A condition for applying the charge/readout type B is that the number of charge lines is less than 2,000. As an example satisfying this condition, when the number of charge lines is 300, the corrected number of charge lines is acquired as 1,200 by division with the readout ratio "¼". After the execution of Step S153 or S154 illustrated in FIG. 9, the processing proceeds to Step S155.

In Step S155 illustrated in FIG. 9, mask processing of the number of charge lines is carried out. In order to acquire uniform exposure time on the photographing screen (within one frame), for various skip setting values, charge time needs to be set equal among all readout object lines. In other words, among the lines of the image sensor 101, the number of charge lines needs to be equal, and charge time needs to be equal as real time. To satisfy those requirements, the number of charge lines after correction needs to be an integral multiple of the number of lines of a skip unit. When the number of charge lines after correction is not an integral multiple of the number of lines of a skip unit, charging may be carried out at a specific line of the image sensor 101 for extra time. Thus, the number of charge lines after correction is masked to be an integral multiple of the number of lines of a skip unit. For example, in the case of 1,203 charge lines after correction calculated in Step S153 illustrated in FIG. 9, the number is not an integral multiple of the number "4" of lines of a skip unit. Thus, when mask processing is applied in Step S155, the number of charge lines after correction is 1,200. According to this exemplary embodiment, the number of charge lines after correction calculated in Step S153 is 1,200, which is an integral multiple of the number "4" of lines of a skip unit, and a result of applying the processing of Step S155 is 1,200. Thus, there is no difference. Details are described below using a timing chart referring to Step S160 illustrated in FIG. 6.

A value for masking is desirably an integral multiple of the number of lines of a skip unit. However, when overhead processing time for controlling the image sensor 101 is taken into consideration, for example, a mask value may be an integral multiple+1. When the present invention is applied, the value masked in Step S155 may be an arbitrary value in accordance with specifications of the image sensor 101. When Step S155 illustrated in FIG. 9 has been carried out, the subroutine illustrated in FIG. 9 is ended, and the processing proceeds to Step S160 illustrated in FIG. 6.

Figure 10:
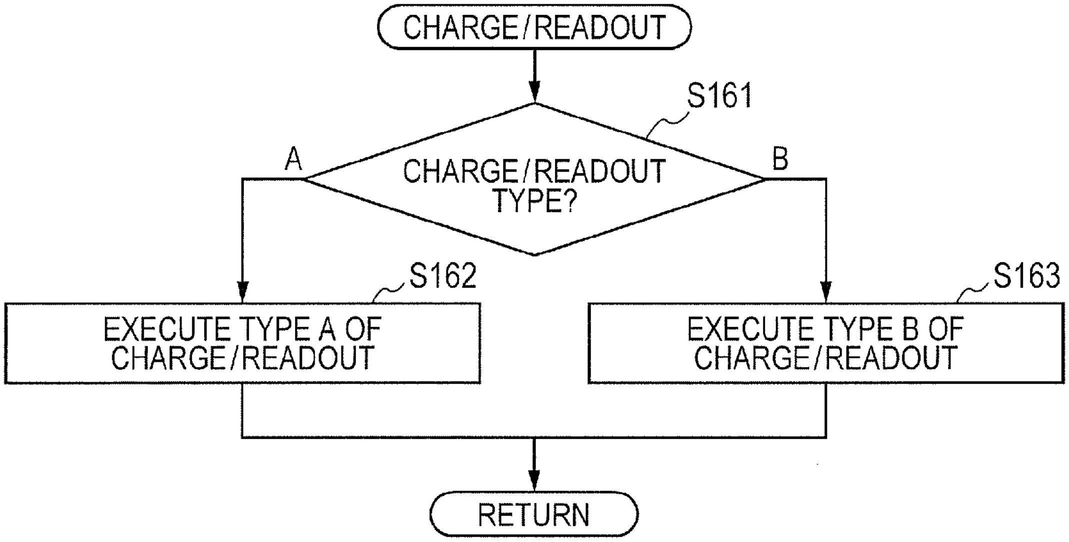
FIG. 10 is a flowchart illustrating a subroutine of Step S160 of the readout processing illustrated in FIG. 6.

In Step S160 illustrated in FIG. 6, charge/readout processing is carried out. FIG. 10 illustrates a subroutine of Step S160. In FIG. 10, the processing is carried out in order from Step 3161. In Step S161 illustrated in FIG. 10, as in the case of Step S151 illustrated in FIG. 9, the charge/readout type set in Step S143 or S144 is evaluated. When the charge/readout type A is set, the processing proceeds to Step S162. When the charge/readout type B is set, the processing proceeds to Step S163.

Step S162 illustrated in FIG. 10 is described. In Step S162, image pickup processing of the charge/readout type A is carried out. The image pickup processing of the charge/readout type A is described referring to FIG. 11.

Figure 11:
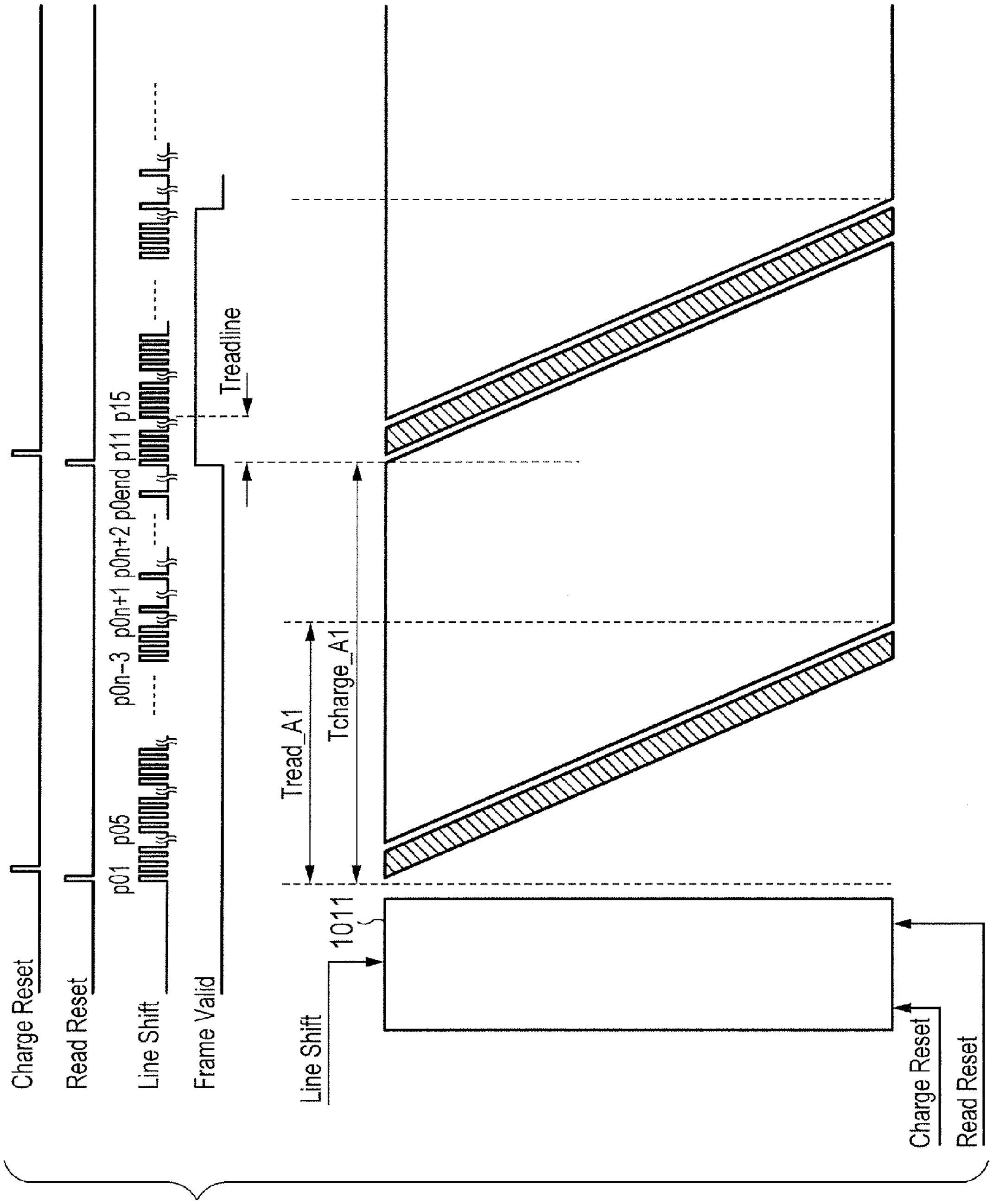
FIG. 11 is a timing chart illustrating a charge/readout type A in the image pickup apparatus according to the first exemplary embodiment.

In FIG. 11, as in the case illustrated in FIG. 3, the control lines ChargeReset, ReadReset, and LineShift are connected to the vertical circuit 1011, and a timing chart is illustrated in the upper part. Step S162 illustrated in FIG. 10, that is, an example of image pickup control of the image sensor 101 including 2,000 lines is described in FIG. 11. The example is described based on the setting that the number of lines of a skip unit is "4" as set in Step S110 illustrated in FIG. 6 and the number of charge lines is 3,500 as calculated in Step S155 illustrated in FIG. 9.

In FIG. 11, first, by inputting one-shot pulses to the control lines ReadReset and LineShift at a time p01, a first line of the image sensor 101 is started to be read out. Immediately after the input of the one-shot pulse to the control line LineShift at the time p01, at times p02, p03 and p04 (not shown), one-shot pulses are continuously input to the control line LineShift. In addition, at the time p02, one-shot pulse is input to the control line ChargeReset.

In the example illustrated in FIG. 3, after the input of the control line LineShift pulse at the time p01, the pixel signal of the first line is read out. From the time p01 to the time p04 illustrated in FIG. 11, the processing proceeds to readout selection of the fourth line without reading out the first to third lines. In other words, the first to third lines are skipped. After the input of the control line LineShift pulse at the time p04, the fourth line of the image sensor 101 is started to be read out.

As in the case illustrated in FIG. 3, a pixel signal of the fourth line is read out by using the control lines TransferH and Hpulse of the horizontal circuit 1012 (not shown). As in the case described above referring to FIG. 3, during the readout of the pixel signal, AD conversion is carried out by the ADC 103 illustrated in FIG. 1 in synchronization with the control line Hpulse. After readout of the pixel signal of the fourth line is ended, at a next time p05, as in the case at the time p01, a one-shot pulse is input to the control line LineShift. From a time p06 to a time p08 immediately thereafter, as in the case from the time p02 to the time p04, one-shot pulses are continuously input to the control line LineShift, and readout of the eighth line is carried out. Thus, in FIG. 11, skipping and readout of the image sensor 101 are carried out by the four-line unit.

Treadline illustrated in FIG. 11 indicates time necessary for reading out a pixel signal of a single line. In FIG. 11, a period of time from the time p01 to the time p04 is sufficiently short, and the combined skipping time and readout time by the four-line unit is equal to the Treadline illustrated in FIG. 3. When those generalized for n readout lines, the number of lines of a skip unit−1 line (=3 lines) is skipped from the time p0*n*−3 to the time p0*n*, and one line is read out. In the example of this exemplary embodiment, because of the use of the image sensor 101 including 2,000 lines, n=2,000 is set. At a time n and thereafter, pulses are input to the control line LineShift at a Treadline interval as in the case illustrated in FIG. 3. The pulses are continuously output to the control line LineShift at the fixed Treadline interval at the time n and thereafter. It is because time of lines continuously subjected to charging is managed based on the count of pulses output to the control line LineShift, and this necessitates continuous outputting of the pulses at the fixed interval. When pulses are input to the control line LineShift until a time p0end, at a time p11 and thereafter, as in the above-mentioned case, skip and readout processing is carried out by the four-line unit. The "end" of the time p0end indicates the number of charge lines. For example, when the number of charge lines after correction is 3,500, end=3,500 is set. When one-shot pulses to the control line LineShift are counted, and the count reaches the number of charge lines, charging of an amount equal to the time is carried out in the image sensor 101.

In FIG. 11, readout time Tread_A1 of pixel signals equivalent to 2,000 lines is ¼ of the Tread_A shown in FIG. 3, that is, readout time of 500 lines, because skip and readout processing by the four-line unit is carried out as described above. The number of charge lines to each line becomes shorter by 1,500 lines because the readout time becomes ¼. Specifically, while the time equivalent to the number of charge lines 2,000 (input charge time) is secured at the time p0*n* in FIG. 3, in FIG. 11, the number of charge lines is 500 at the first line at the time p0*n*. In other words, at the time p0*n*, the pulses to the control line LineShift are counted by 2,000 times equivalent to the total number of lines. In real time, however, because of the skipping readout, time equivalent to Treadline×500 has passed. Accordingly, further charging is necessary for the time equivalent to Treadline×500 in real time from the time p0*n*. Thus, as corrected in Step S154 illustrated in FIG. 9, charging is additionally carried out for time equivalent to the remaining number of charge lines 1,500 until the time p0end. In other words, image pickup control is carried out so that the charge time Tcharge_A illustrated in FIG. 3 and the charge time Tcharge_A1 illustrated in FIG. 11 are equal to each other in real time. In other words, in order to read out lines to be read out by the skipping readout at the fixed time interval within the readout object range, pulses are input to the control line LineShift within negligible short time with respect to the 1,500 lines to be skipped. Thus, for the charge time managed based on the count of pulses to the same control line LineShift, the number of charge lines (charge time) needs to be corrected for time (Treadline×1,500) corresponding to the skipped 1,500 lines. The corrected number of charge lines is calculated in Step S154. This correction prevents the skip readout condition from affecting substantial charge time in the charge/readout type A to change. Further, through the mask processing of the number of charge lines carried out in Step S155 illustrated in FIG. 9, the charge time is equal among all the lines of the image sensor 101. It is because of symmetry of all the charge start timing and the readout timing of the image sensor 101 at each start timing by the skip unit.

Thus, in FIG. 11, by adding the correction amount to the number of charge lines illustrated in FIG. 9 and applying the mask processing based on the number of lines of a skip unit, the charge time is set equal among all the lines of the image sensor 101. As a result, a difference in charge time between the lines of the image sensor 101 can be reduced, and the occurrence of uneven exposure or the like can be suppressed.

Returning to the flowchart illustrated in FIG. 10, in Step S163, image pickup processing of the charge/readout type B is carried out. The image pickup processing of the charge/readout type B is described referring to FIG. 12.

Figure 12:
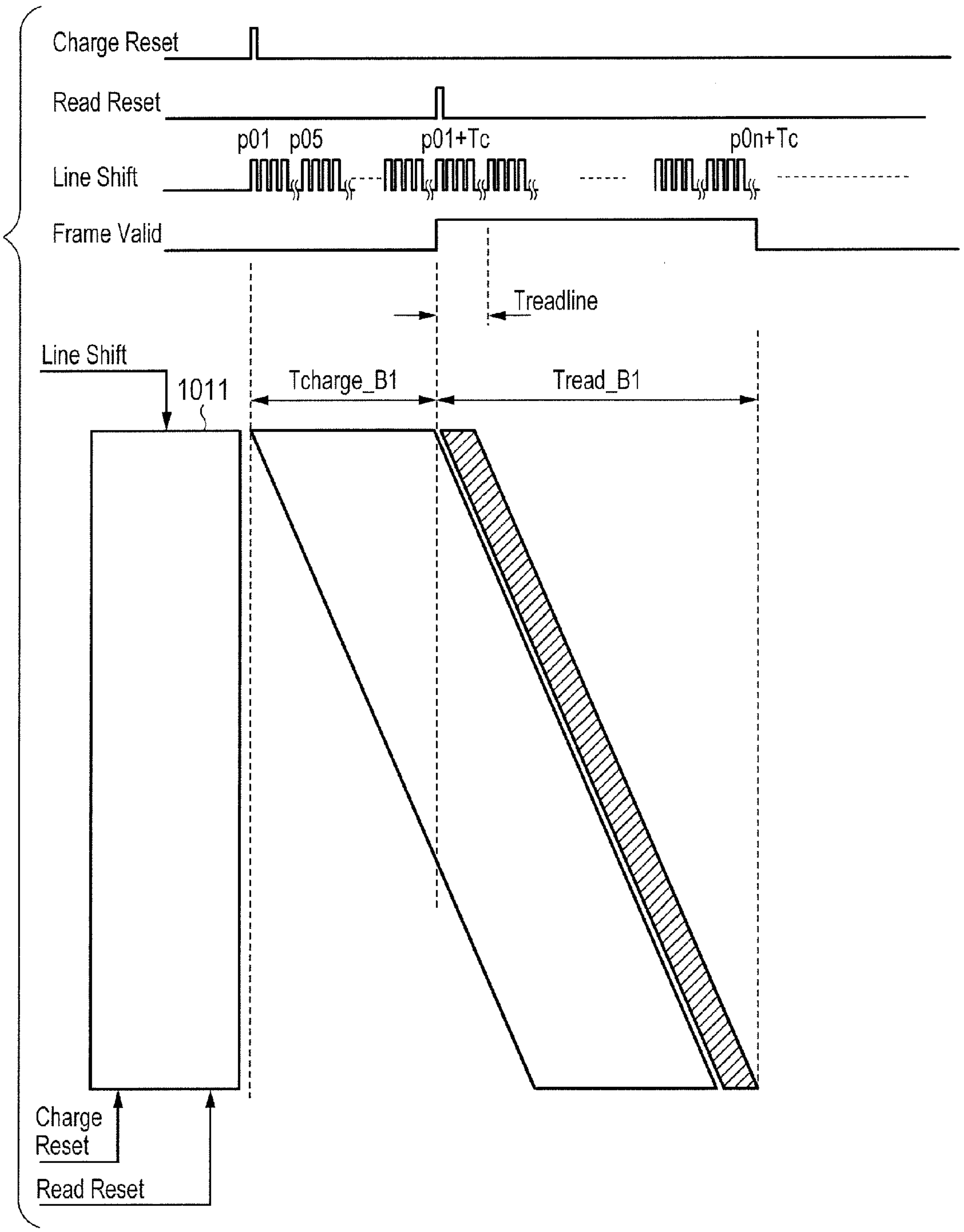
FIG. 12 is a timing chart illustrating a charge/readout type B in the image pickup apparatus according to the first exemplary embodiment.

In FIG. 12, as in the case illustrated in FIG. 11, the control lines ChargeReset, ReadReset, and LineShift are connected to the vertical circuit 1011, and a timing chart is illustrated in the upper part. An example of image pickup control of the image sensor 101 including 2,000 lines is described based on the setting that the number of lines of a skip unit is "4" as set in Step S110 illustrated in FIG. 6 and the number of charge lines is 1,200 as calculated in Step S155 illustrated in FIG. 9. As in the case of the charge/readout type A described above referring to FIG. 11, 4k lines (k is natural number) are read out while (4k−1)-th, (4k−2)-th, and (4k−3)-th lines are skipped.

In FIG. 12, first, by inputting one-shot pulses to the control lines ChargeReset and LineShift at a time p01, a first line of the image sensor 101 is started to be read out. Immediately after the input of the one-shot pulse to the control line LineShift at the time p01, one-shot pulses are continuously input to the control line LineShift at the time p02, p03 and p04. In this case, charging of the second line to the fourth line of the image sensor 101 is started. As in the case of the time interval between the time p01 and the time p04 illustrated in FIG. 11, this time interval is sufficiently shorter than the time interval Treadline. After the passage of time of Treadline from the time p04, that is, at a time p05, a one-shot pulse is input to the control line LineShift. Immediately after the time p05, as in the case of the time p02 to the time p04, from a time p06 to a time p08, one-shot pulses are continuously input to the control line LineShift. At a time p09 and thereafter, similarly, one-shot pulses are input to the control line LineShift. Then, when one-shot pulses are input to each of the control lines ReadReset and LineShift at a time p01+Tc, image signal readout is started from the image sensor 101. Tc indicates the number of charge lines calculated in Step S153 illustrated in FIG. 9, and is specifically 1,200 lines. In other words, after the start of charging of a predetermined readout object line of the image sensor, the predetermined readout object line is read out from when charging of a line, which is after the number of charge lines (count) from the predetermined readout object line, is started.

After the input of the one-shot pulse at the time p01+Tc, one-shot pulses are input to the control line LineShift at a time p02+Tc, a time p03+Tc, and a time p04+Tc. Accordingly, the processing proceeds to selection of the fourth line without reading out the first to third lines. This operation is similar to that described above referring to FIG. 11. In other words, the first to third lines are skipped, and the pulse is input to the control line LineShift at the time p04+Tc, and then the fourth line of the image sensor is started to be read out. As in the case illustrated in FIG. 3, a pixel signal of the fourth line is read out by using the control lines TransferH and Hpulse of the horizontal circuit 1012 (not shown). As in the case described above referring to FIG. 3, during the readout of the pixel signal, AD conversion is carried out by the ADC 103 illustrated in FIG. 1 in synchronization with the control line Hpulse. Thereafter, similarly, image signal readout is carried out.

In FIG. 12, a period of time from the time p01+Tc to the time p04+Tc is sufficiently short as in the case illustrated in FIG. 11, and the combined skipping time and readout time by the four-line unit is equal to the Treadline illustrated in FIG. 3. When those are generalized for n readout lines, from the time p01 to the times p0$n$−1+Tc and P0$n$+Tc, three lines are skipped and one line is read out repeatedly in a cycle. In the example of this exemplary embodiment, the number of lines of the image sensor 101 is set to n=2,000 as in the case illustrated in FIG. 11.

In FIG. 12, the charge time Tcharge_B1 is Tc when converted into the number of charge lines, namely, 1,200 lines. Through the skipping and readout processing by the four-line unit, the charge time as real time is ¼, namely, Treadline×300 lines, which is equal to the charge time input in Step S110 illustrated in FIG. 6 in real time. In other words, a photographing image is captured, the exposure level of which is desired and input by the user. Through the skipping and readout processing by the four-line unit, Tread B1 illustrated in FIG. 12 is ¼ of the Tread_A and the Tread_B illustrated in FIGS. 3 and 4, that is, readout time of 300 lines. In the charge/readout type B, readout of all the lines within the readout object range is not ended within the charge time. Accordingly, when skipping readout is set, a pulse to the control line LineShift as a criterion for controlling the charge time is output at a Treadline interval only at readout timing of a readout line, and at a negligibly short interval at line skipping timing. Thus, in order to maintain constant charge time irrespective of presence of skipping readout, the number of charge lines needs to be corrected by a readout ratio, and this is calculated in Step S153. This correction prevents the skip readout condition from affecting substantial charge time in the charge/readout type B to change.

In the image pickup control in the charge/readout mode B illustrated in FIG. 12, at the time p01+Tc, charging of the Tc+1-th line is started. In other words, when readout processing of a certain line is carried out, charging of a line whose number is acquired by adding the same number of charge lines is started. As described above referring to FIG. 11, to achieve equal charge time among all the lines of the image sensor 101, pulse processing by the four-line unit to the control line LineShift needs to be consistently carried out from the charge start of the first line to the charging of the last line. In the example of this exemplary embodiment where the skip unit is "4", as in the case described above referring to FIG. 11, the number of charge lines is a multiple of 4 through the mask processing of the number of charge lines carried out in Step S155 illustrated in FIG. 9. Through such mask processing, symmetry can be provided for all the charge start timing and the readout timing of the image sensor 101 at each start timing by the skip units. As a result, in FIG. 12, as in the case illustrated in FIG. 11, charge time is equal among the lines of the image sensor 101.

According to this exemplary embodiment, the number of charge lines is calculated based on the readout time per line of the image sensor 101. The number of charge lines is corrected based on the skipping set in Step S110 illustrated in FIG. 6, and then the image pickup control of the image sensor 101 is carried out. In particular, by adding the mask processing carried out in Step S155 illustrated in FIG. 9, even when skip processing is carried out, the charge time can be set equal among all the lines of the image sensor 101. For those, the numbers of charge lines needs to be individually corrected by the two types of image pickup control, and the image pickup control example in each type has been described.

The number of lines of a skip unit, the charge time, and the number of pixels of the image sensor according to this exemplary embodiment are in no way limitative. The present invention can be applied to various setting values or pixel numbers. This exemplary embodiment has been described by way of example where the number of readout lines is 1 with respect to the number of lines of a skip unit. However, the number of readout lines is not limited to 1. For example, in the case of a monochrome camera or a color camera including three image pickup elements, it is preferred to apply the arrangement of this exemplary embodiment. On the other hand, in the case of a color camera including a single image pickup element, consideration needs to be given to a Bayer array. In other words, when an image pickup element including a Bayer array in which one color is created over a plurality of lines is used, the number of lines to be read out may be 2 or more with respect to the skip unit.

A general image sensor includes areas having no photoelectric conversion elements or light shielding areas at several tens of lines from the first line. Based on pixel signals in those two types of areas, a black reference level of an effective pixel area is generally corrected. When skip processing is carried out in the charge/readout type B, in order to maintain symmetry between the charge start timing and the readout start timing, it is desired to carry out skipping and readout by the number of lines of a skip unit from the first line to the last line. On the other hand, when skip processing is carried out in the charge/readout type A, skip processing may be carried out only in the effective pixel area without skipping during readout in the two areas.

Thus, according to this exemplary embodiment, in photographing with the skip processing, uneven exposure between the lines of the captured image can be reduced.

Second Exemplary Embodiment

The first exemplary embodiment has been described by way of example of carrying out the image pickup control on the entire screen of the image sensor 101 based on the predetermined skip ratio. This exemplary embodiment describes image control where a part of interest areas are extracted as readout object areas while skipping other areas. As described above in the first exemplary embodiment referring to FIG. 12, in the charge/readout type B, the charge time is shorter than the readout time, and the line acquired by adding the number of charge lines to the readout line is the charge start line. When there is a plurality of interest areas, if areas other than the interest areas are skipped, the charge time of the interest areas (readout areas) may be reduced. Accordingly, the charge time may vary between lines of the interest area, consequently generating uneven luminance in the interest area. According to this exemplary embodiment, on such a photographing condition, even when there are plurality of interest areas, that is, readout areas, uneven luminance between lines is reduced.

A configuration of the image pickup apparatus and a configuration of the image sensor 101 according to this exemplary embodiment are illustrated in FIGS. 1 and 2. Those configurations are similar to those of the first exemplary embodiment, and thus description thereof is omitted.

Figure 13:
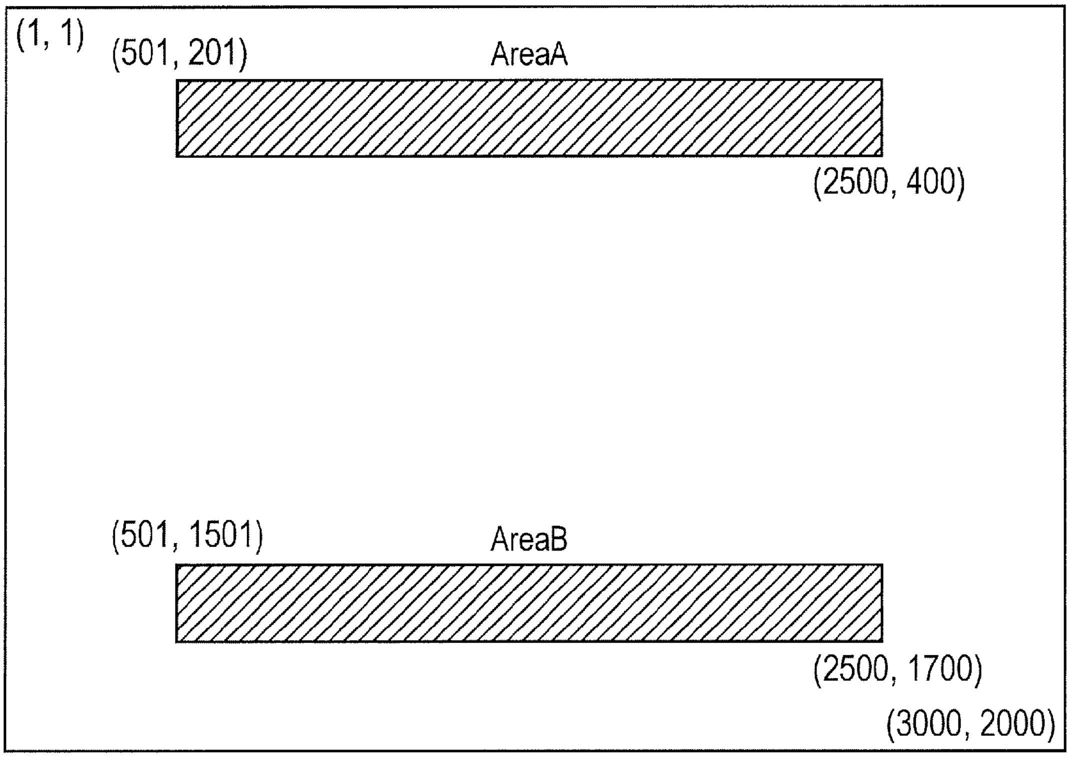
FIG. 13 is a diagram illustrating a setting example of a readout object line in an image pickup element according to a second exemplary embodiment of the present invention.
Figure 14:
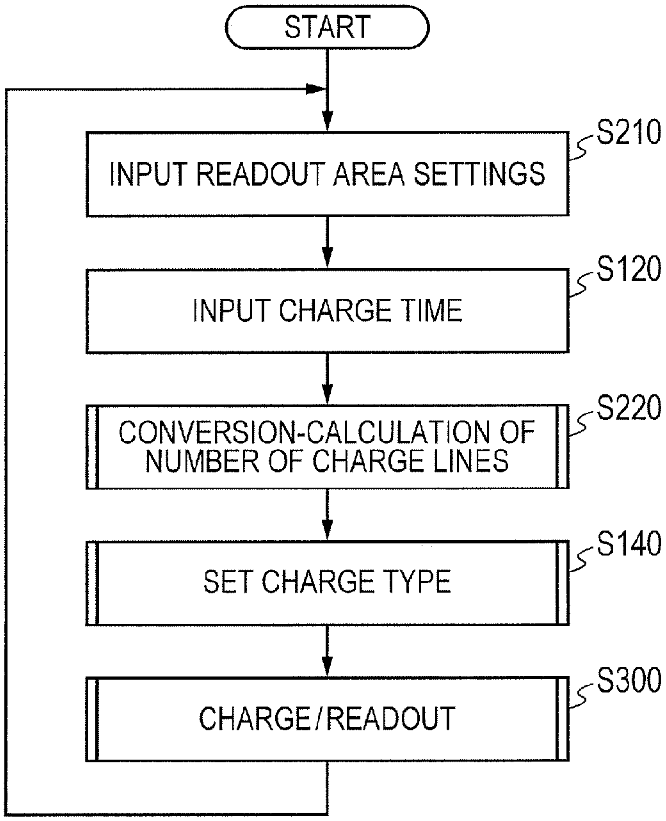
FIG. 14 is a flowchart illustrating readout processing of an image pickup apparatus according to the second exemplary embodiment.

This exemplary embodiment describes an image pickup example where two interest areas are vertically set in the image sensor 101. FIG. 13 illustrates an example where the image sensor 101 includes 2,000 lines of image pickup elements. In this exemplary embodiment, an example is described where exposure time is set equal between lines when two interest areas AreaA and AreaB indicated by shaded parts illustrated in FIG. 13 are selected to be read out. FIG. 14 is a flowchart illustrating processing carried out by the image pickup apparatus 100 according to this exemplary embodiment. When power is turned ON for the image pickup apparatus 100, the processing is carried out in order from Step S210 illustrated in FIG. 14.

First, in Step S210 of the flowchart illustrated in FIG. 14, readout area setting is input. This setting is input through a readout condition input unit 107 by the readout condition setter 300 illustrated in FIG. 1. According to this exemplary embodiment, in order to read out the area of the shaded part illustrated in FIG. 13 as the readout area, start coordinates (X, Y) and end coordinates (X, Y) serving as coordinate information of the readout area are input as follows.

AreaA: Start coordinates (501, 201), end coordinates (2500, 400)

AreaB: Start coordinates (501, 1501), end coordinates (2500, 1700)

A readout setting value is stored in the readout condition input unit 107 illustrated in FIG. 1, and input to a charge controller 109. After the execution of Step S210 illustrated in FIG. 14, the processing proceeds to Step S120.

In Step S120 illustrated in FIG. 14, charge time corresponding to a shutter speed is input as in the case of the first exemplary embodiment. After the execution of Step 3120, the processing proceeds to Step S220.

Figure 15:
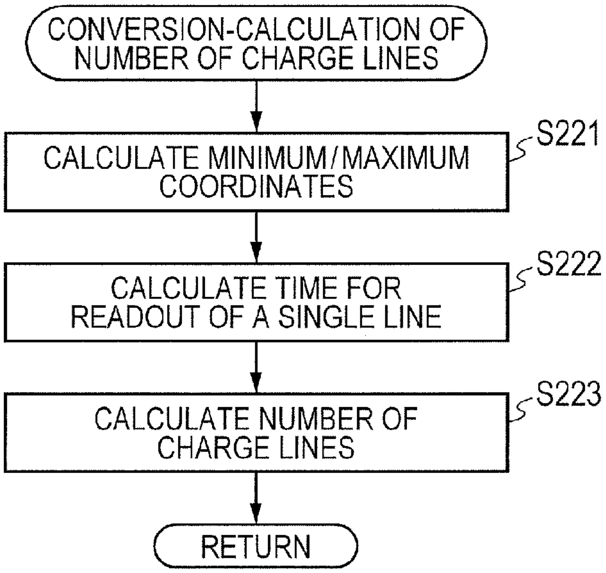
FIG. 15 is a flowchart illustrating a subroutine of Step S220 of the readout processing illustrated in FIG. 14.

In Step S220 illustrated in FIG. 14, the charge time is converted by calculation into the number of charge lines. FIG. 15 illustrates a subroutine of Step S220.

Figure 16:
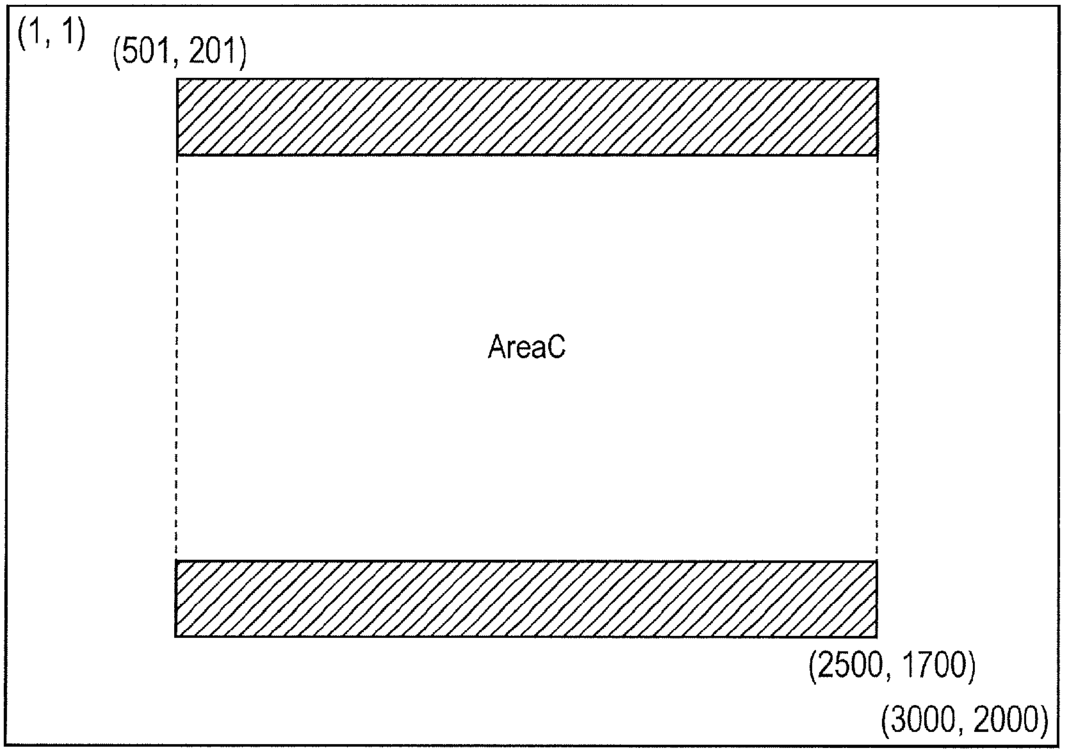
FIG. 16 is a diagram illustrating a readout object line in an image pickup element according to a second exemplary embodiment of the present invention.

In the subroutine illustrated in FIG. 15, processing is carried out in order from Step S221. First, in Step S221, minimum and maximum coordinates of the readout areas are calculated. The minimum and maximum coordinates of X and Y are acquired from the areas AreaA and AreaB. As illustrated in FIG. 16, when the areas AreaA and AreaB are regarded as one area AreaC, the following minimum and maximum coordinates are acquired. In this exemplary embodiment, 1,500 lines from the AreaA to the AreaB constitute a readout object area including skipping.

AreaC: minimum coordinates (501, 201), maximum coordinates (2500, 1700)

Proceeding to Step S222 illustrated in FIG. 15, readout time per line is calculated. First, a width of the AreaC is calculated to be 2,000 pixels. Time for reading out this number of width pixels is set as readout time per line. As in the case of the first exemplary embodiment, calculation is carried out based on readout time per pixel and the number of width pixels of the AreaC in view of overhead time for reading out a single line. Then, proceeding to Step S223, the number of charge lines is calculated by dividing the charge time input in Step S120 by the readout time per line calculated in Step S222.

The readout time Treadline per line calculated in the first exemplary embodiment is based on the assumption that all the pixel data of a single line are read. On the other hand, according to this exemplary embodiment, as illustrated in FIGS. 13 and 16, the number of horizontal pixels of the readout object area is 2,000, which is ⅔ of all the pixels of 3,000 per line. As described above, readout time of a pixel signal by the control line Hpulse depends on the number of readout pixels per line. Thus, the readout time is about ⅔ of that of the first exemplary embodiment. In Step S132 illustrated in FIG. 7, the number of charge lines is calculated to be 1.5 times as large as that of the first exemplary embodiment. Accordingly, the readout time of the pixel signal per line changes depending on the size of the readout area input in Step S210.

Returning to the flowchart of FIG. 15, after execution of Step S223, the subroutine illustrated in FIG. 15 is ended, and the processing proceeds to Step S140 illustrated in FIG. 14.

In Step S140 illustrated in FIG. 14, a charge type is set as in the case illustrated in the first exemplary embodiment. In this exemplary embodiment, the number of readout lines is 1,500 as illustrated in FIG. 16. Accordingly, in a determination expression implemented in Step S142 illustrated in FIG. 8, which is a subroutine of Step S140, based on a result of size comparison with the number of readout lines, namely, 1,500 lines, a charge/readout type A or B is selected. After the execution of Step S140, the processing proceeds to Step S300.

Figure 17:
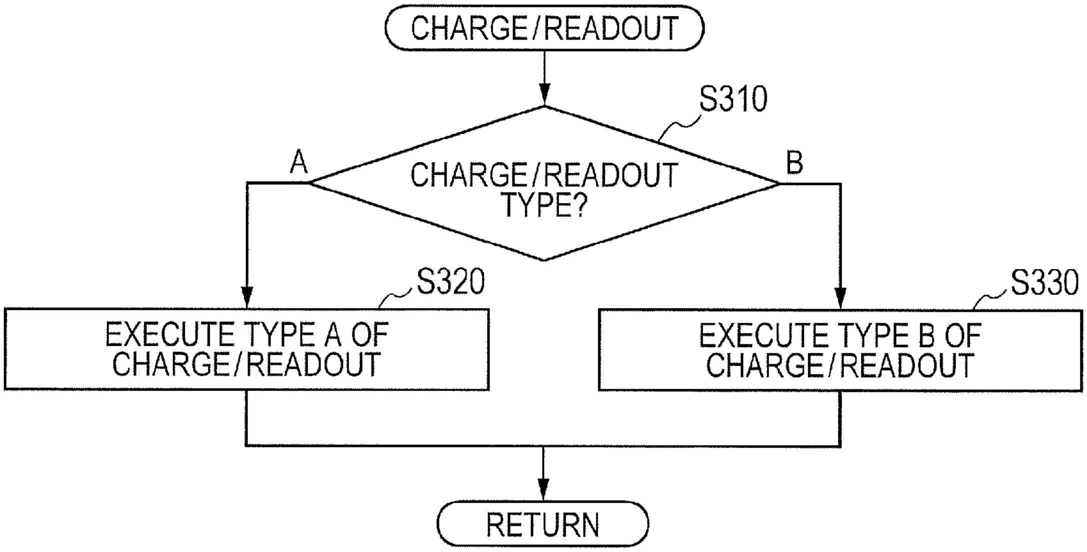
FIG. 17 is a flowchart illustrating a subroutine of Step S300 of the readout processing in the second exemplary embodiment illustrated in FIG. 14.

In Step S300 illustrated in FIG. 14, image pickup control of the image sensor 101 is carried out. In Step S300, as in the case of Step S160 illustrated in FIG. 6, a charge/readout type A or B is carried out based on a size comparison result of the number of charge lines and the number of readout lines. FIG. 17 illustrates a subroutine of Step S300.

In FIG. 17, first, in Step S310, a charge/readout type is determined. As in the case of Step S161 illustrated in FIG. 10, in accordance with the charge type set in Step S140 illustrated in FIG. 14, the processing proceeds to Step S320 when the type is a charge/readout type A, and to Step S330 when the type is a charge/readout type B.

Figure 18:
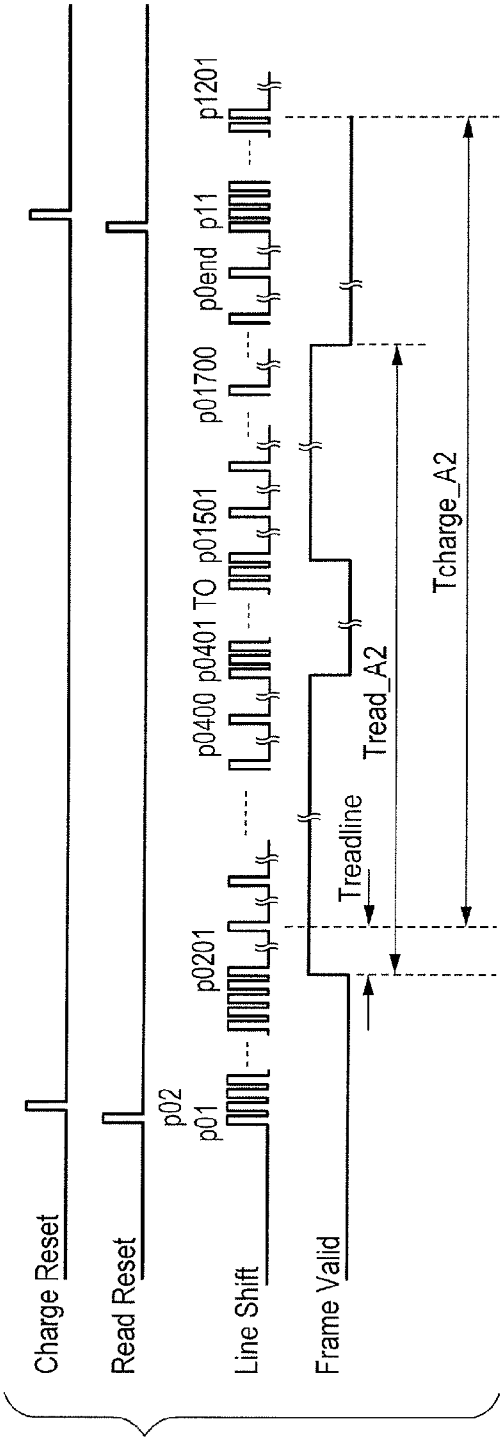
FIG. 18 is a timing chart illustrating a charge/readout type A in the image pickup apparatus according to the second exemplary embodiment.

In Step S320 illustrated in FIG. 17, the charge/readout type A is carried out. FIG. 18 is a timing chart illustrating the processing of Step S320.

In FIG. 18, at a time p01, one-shot pulses are input to the control lines LineShift and ReadReset to start readout of the first line of the image sensor 101. At a time p02 immediately after the time p01, by inputting one-shot pulses to the control lines ChargeReset and LineShift, readout of the second line and charging of the first line of the image sensor 101 are started. By continuously inputting one-shot pulses to the control line LineShift from the time p01 to the time p0201, the first to 200th lines of the image sensor 101 are skipped. At the time p0201 and thereafter, until a time p0400, by inputting one-shot pulses to the control line LineShift at an interval of Treadline, pixel signals of the AreaA, that is, the 201st to 400th lines, are read out. The Treadline in this exemplary embodiment is, as described above in Step S220 illustrated in FIG. 14, ⅔ of the Treadline time interval of the first exemplary embodiment.

From the time p0401 to the time p01501 illustrated in FIG. 18, as in the case of the skip processing from the time p01, one-shot pulses are continuously input to the control line LineShift. The time of skip processing from the time p01 to the time p0201 and the time of skip processing from the time p401 to the time p01501 are sufficiently shorter than the Treadline. Thus, readout of the 401st to 1,500th lines is skipped. At the time p01501 and thereafter, until a time p01700, by inputting one-shot pulses to the control line LineShift at an interval of Treadline, pixel signals of the AreaB, that is, the 1,501st to 1,700th lines, are read out. After the pixel signals up to the 1,700th line have been read out, charging is carried out by an amount equal to the number of charge lines calculated in Step S220 illustrated in FIG. 14, that is, a timing point of a time p0end. Then, at a time p11, a one-shot pulse is input to the control line ReadReset to end the charging. At the time p11 and thereafter, pixel signals are read out by carrying out processing similar to that from the time p01.

A period of a Hi state of FrameValid illustrated in FIG. 18 is a pixel signal readout period from the AreaA to the AreaB illustrated in FIGS. 13 and 16, that is, the AreaC. Time for reading out 1,500 readout object lines of the AreaC is indicated by Tread_A2 illustrated in FIG. 18. However, the time spent is not the readout time of 1,500 lines. Areas other than the AreaA and AreaB are skipped. Thus, readout time is equivalent to a total number of lines, namely, 400 lines, of the AreaA and AreaB.

In the skip processing by the charge/readout type A illustrated in FIG. 18, because of a one-line difference between the control lines ReadReset and ChargeReset, a real time difference Tcharge_A2 from the charge start to the readout start is equal between the numbers of lines of the image sensor 101. In other words, even when a plurality of readout areas such as the AreaA and AreaB are set, and areas other than the object areas are skipped, charge time can be set equal between the lines of the image sensor 101. This is because a time difference in a charge start between the lines in the object area is set to the Treadline so as to be equal to the time difference in a readout start of the same area between the lines.

Returning to the flowchart illustrated in FIG. 17, in Step S330 illustrated in FIG. 17, the charge/readout type B is carried out. In the charge/readout type B, there is a difference equal to the number of charge lines between the charge start timing of the control line ChargeReset and the readout start timing of the control line ReadReset. In the rolling shutter, in the charge/readout type B, there is a restriction that charging is started at a line acquired by adding the number of charge lines to a currently read line. In view of those, when skipping is carried out in the charge/readout type B, in order to guarantee equal charge time among all the line numbers of the image sensor 101, it is desired to switch whether charging and reading are to be skipped or not in the object area.

At least in order to achieve equal charge time between lines in the AreaA and AreaB, as described above, at the timing of carrying out readout and charging in the AreaA and AreaB, one-shot pulses need to be input to the control line LineShift at the interval of Treadline. A relationship between the readout line and the charge start line where charging is started at this time of readout is represented by Expression (6) using the number of charge lines.

$$\text{Readout line} = \text{charge start line} - \text{number of charge lines} \tag{6}$$

Skipping of the readout line and the charge start line is inhibited when Conditional Expressions (7) and (8) are satisfied:

$$\text{Readout area start line readout line} \leq \text{readout area end line} \tag{7}$$

$$\text{Readout area start line} \leq \text{charge start line} \leq \text{readout area end line} \tag{8}$$

By determining whether to skip or not to satisfy Expressions (6) to (8), exposure (charge time) of each line in the interest area (readout area) can be maintained constant to reduce image quality deterioration. As a specific case, an example where the number of charge lines is 100 is described referring to the timing chart of FIG. 19. Concerning the 100 charge lines, the number of charge lines set in Step S220 illustrated in FIG. 14 is assumed.

Figure 19:
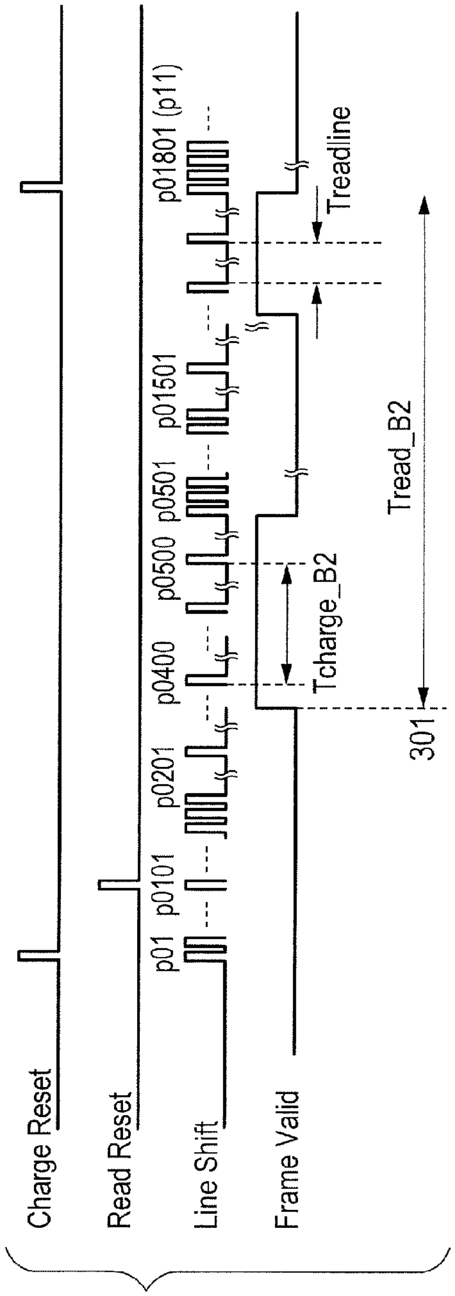
FIG. 19 is a timing chart illustrating a charge/readout type B in the image pickup apparatus according to the second exemplary embodiment.

In FIG. 19, at a time p01, one-shot pulses are input to the control lines LineShift and ChargeReset to start charging of the first line of the image sensor 101. By continuously inputting one-shot pulses to the control line LineShift until the time p0201, that is, the 201st line, charging of the first to 200th lines is continuously started. From the first to 200th lines, a skip operation of a charge start may be carried out in view of Expression (8). At the time p0101, a one-shot pulse is input to the control line ReadReset. Thus, readout of the first to 100th lines is skipped.

During the period from the time p0201 to the time p0501 illustrated in FIG. 19, one-shot pulses are input to the control line LineShift at an interval of Treadline. At this time, from the 201st to 501st lines, charging has been started at each line with the time difference of the pulses to the control line LineShift. Simultaneously, by Expression (6), pixel signals of the 101st to 400th lines have been read out without being skipped. During this period, the pixel signals have been read out from the previous 100 lines in the AreaA.

During the period from the time p0501 to the time p01501 illustrated in FIG. 19, one-shot pulses are continuously input to the control line LineShift. Accordingly, charging is continuously started from the 501st to 1,500th lines, while readout of the 401st to 1,400th lines is skipped. During this period, skipping may be carried out because of readout of the areas other than the AreaA and AreaB.

Similarly, during the period from the time p01501 to the time p1801 illustrated in FIG. 19, one-shot pulses are input to the control line LineShift at an interval of Treadline. At this time, from the 1,501st to 1,801st lines, charging has been started at each line with the time difference of the pulses to the control line LineShift. Simultaneously, by Expression (6), pixel signals of the 1,401st to 1,700th lines have been read out without being skipped. During this period, the pixel signals have been read out from the previous 100 lines in the AreaB. At the time p01801 illustrated in FIG. 19, a one-shot pulse is simultaneously input to the control line ChargeReset to start charging of a next frame.

Thus, at each of the lines of the AreaA and AreaB, charge time is a length acquired by multiplying 100 lines by the Treadline from the charge start to the charge end, that is, until the readout start. Therefore, uneven exposure is unlikely to occur.

According to this exemplary embodiment, the time of skip processing is sufficiently shorter than the readout time Treadline per line. On the other hand, when the number of lines to be skipped is large or when readout time Treadline per line is short, processing time for skipping may not be negligible. In such a case, it is preferred to calculate the number of charge lines in view of the skip processing time. This exemplary embodiment has been described by way of example where the number of charge lines is 100 in the charge/readout type B. However, the number of charge lines is not limited to 100. In the charge/readout type B, for various numbers of charge lines and charge time, it may be determined whether to skip or not under the condition of satisfying Expressions from (6) to (8).

While the exemplary embodiments according to the present invention have been described, it is to be understood that the invention is not limited to the disclosed exemplary embodiments, and various modifications and changes can be made within the gist of the present invention. Further, the exemplary embodiments described herein may be combined to implement the present invention.

The present invention has been described by way of example where "2" and "4" are set as the skip unit numbers. However, the number of skip units may be arbitrarily set.

The number of readout lines has been described to be "1" with respect to the number of skip units. However, as described above, when color photographing is carried out, the number of readout lines may be set in view of a Bayer array to be applied. The present invention has been described by way of example where up to four interest areas are set. However, there is no limitation on the number of interest areas, coordinates, and sizes of the areas. The present invention is applicable when the number of interest areas (readout areas), which have various shapes and sizes, is at least one. The photographing image has been described by way of example of the pixel number of 3,000×2,000. However, the number of pixels is not limited to this number.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-017341, filed Jan. 31, 2014, which is hereby incorporated by reference herein in its entirety.

What is claimed is:

1. An image pickup apparatus comprising:

an image sensor of a rolling shutter type;

a count number calculator which calculates a count number corresponding to an accumulation time based on a signal readout time per a readout unit line of the image sensor;

a skip setter which sets a skip line in which processing concerning at least one of an accumulating operation and a readout operation in the image sensor is skipped; and a controller which controls the accumulating operation and the readout operation of the image sensor so as to achieve uniform accumulation time of the readout unit line within one frame based on the count number and the skip line.

2. The image pickup apparatus according to claim 1, wherein the skip setter further sets skip areas, and the skip areas set by the skip setter are nonuniformly present within the one frame.

3. The image pickup apparatus according to claim 1, further comprising a readout condition setter which sets a readout condition for pixel data readout control from the image sensor, wherein the skip setter, sets the skip line based on the readout condition.

4. The image pickup apparatus according to claim 3, wherein:

the readout condition set by the readout condition setter comprises a skip unit that is a number of lines of a unit pattern of readout lines and skip lines of the image sensor;

the count number calculator calculates the count number based on the accumulation time, readout time per unit line of the readout area, the readout area, and the skip unit; and the skip setter sets the skip line based on the skip unit.

5. The image pickup apparatus according to claim 4, wherein the skip setter avoids setting, as the skip line, in a case where the accumulation time is shorter than the time for reading out all the readout object pixel signals, readout lines and accumulation start lines satisfying:

readout area start line≤readout line≤readout area end line; and readout area start line≤accumulation start line≤readout area end line, where readout line=accumulation start line−count number.

6. The image pickup apparatus according to claim 4, wherein the count number calculator calculates, in a case where the accumulation time is equal to or longer than the readout time for reading out all the readout object pixel signals, the count number based on the accumulation time and the skip unit, and calculates, in a case where the accumulation time is shorter than the readout time, the count number based on the accumulation time and a number of readout object lines of the readout area.

7. The image pickup apparatus according to claim 3, wherein:

the readout condition set by the readout condition setter comprises at least one readout area as a readout object of the image sensor;

the count number calculator calculates the count number based on readout time per unit line of the at least one readout area; and the skip setter sets the skip line based on the at least one readout area and the count number.

8. The image pickup apparatus according to claim 3, wherein the controller starts, in a case where the accumulation time is equal to or longer than readout time for reading out all readout object pixel signals, accumulating of a readout object line and readout of a line next to the readout object line after readout from the readout object line of the image sensor is ended, and starts, in a case where the accumulation time is shorter than the readout time for reading out all the readout object pixel signals, accumulating of the readout object line of the image sensor, and then reads out the readout object line in a case where accumulating of a line, which is after the count number from the readout object line, is started.

9. The image pickup apparatus according to claim 3, wherein the skip setter sets a skip line concerning readout in a case where the accumulation time is equal to or longer than time for reading out all readout object pixel signals, and sets a skip line concerning an accumulation start and readout in a case where the accumulation time is shorter than the readout time.

10. A photographing apparatus, comprising:

a lens; and an image pickup apparatus comprising:

an image sensor of a rolling shutter type;

a count number calculator which calculates a count number corresponding to an accumulation time based on a signal readout time per a readout unit line of the image sensor;

a skip setter which sets a skip line in which processing concerning at least one of an accumulating operation and a readout operation in the image sensor is skipped; and a controller which controls the accumulating operation and the readout operation of the image sensor so as to achieve uniform accumulation time of the readout unit line within one frame based on the count number and the skip line.

11. An image pickup system comprising:

a computing device; and an image pickup apparatus configured to communicate with the computing device, the image pickup apparatus comprising:

an image sensor of a rolling shutter type;

a count number calculator which calculates a count number corresponding to an accumulation time based on a signal readout time per a readout unit line of the image sensor;

a skip setter which sets a skip line in which processing concerning at least one of an accumulating operation and a readout operation in the image sensor is skipped; and a controller which controls the accumulating operation and the readout operation of the image sensor so as to achieve uniform accumulation time of the readout unit line within one frame based on the count number and the skip line.

12. The image pickup system according to claim 11, wherein the skip setter further sets skip areas, and the skip areas set by the skip setter are nonuniformly present within the one frame.

13. The image pickup system according to claim 11, further comprising a readout condition setter which sets a readout condition for pixel data readout control from the image sensor, wherein the skip setter sets the skip line based on the readout condition.

14. The image pickup system according to claim 13, wherein:

the readout condition set by the readout condition setter comprises a skip unit that is a number of lines of a unit pattern of readout lines and skip lines of the image sensor;

the count number calculator calculates the count number based on the accumulation time, readout time per unit line of the readout area, the readout area, and the skip unit; and the skip setter sets the skip line based on the skip unit.

15. The image pickup system according to claim 14, wherein the skip setter avoids setting, as the skip line, in a case where the accumulation time is shorter than the time for reading out all the readout object pixel signals, readout lines and accumulation start lines satisfying:

readout area start line ≤readout line ≤readout area end line; and readout area start line ≤accumulation start line ≤readout area end line, where readout line =accumulation start line-count number.

16. The image pickup system according to claim 14, wherein the count number calculator calculates, in a case where the accumulation time is equal to or longer than the readout time for reading out all the readout object pixel signals, the count number based on the accumulation time and the skip unit, and calculates, in a case where the accumulation time is shorter than the readout time, the count number based on the accumulation time and a number of readout object lines of the readout area.

17. The image pickup system according to claim 13, wherein:

the readout condition set by the readout condition setter comprises at least one readout area as a readout object of the image sensor;

the count number calculator calculates the count number based on readout time per unit line of the at least one readout area; and the skip setter sets the skip line based on the at least one readout area and the count number.

18. The image pickup system according to claim 13, wherein the controller starts, in a case where the accumulation time is equal to or longer than readout time for reading out all readout object pixel signals, accumulating of a readout object line and readout of a line next to the readout object line after readout from the readout object line of the image sensor is ended, and starts, in a case where the accumulation time is shorter than the readout time for reading out all the readout object pixel signals, accumulating of the readout object line of the image sensor, and then reads out the readout object line in a case where accumulating of a line, which is after the count number from the readout object line, is started.

19. The image pickup system according to claim 13, wherein the skip setter sets a skip line concerning readout in a case where the accumulation time is equal to or longer than time for reading out all readout object pixel signals, and sets a skip line concerning an accumulation start and readout in a case where the accumulation time is shorter than the readout time.

20. A control method of an image pickup system comprising an image sensor of a rolling shutter type, the method comprising:

calculating a count number corresponding to an accumulation time based on a signal readout time per a readout unit line of the image sensor;

setting a skip line in which processing concerning at least one of an accumulating operation and a readout operation in the image sensor is skipped; and controlling the accumulating operation and the readout operation of the image sensor so as to achieve uniform accumulation time of the readout unit line within one frame based on the count number and the skip line.

21. The method according to claim 20, further comprising setting skip areas that are nonuniformly present within the one frame.

22. The method according to claim 20, further comprising setting a readout condition for pixel data readout control from the image sensor, wherein the skip line is set based on the readout condition.

23. The method according to claim 22, wherein:

the set readout condition comprises a skip unit that is a number of lines of a unit pattern of readout lines and skip lines of the image sensor;

the count number is calculated based on the accumulation time, readout time per unit line of the readout area, the readout area, and the skip unit; and the skip line is set based on the skip unit.

24. The method according to claim 23, further comprising avoiding setting, as the skip line, in a case where the accumulation time is shorter than the time for reading out all the readout object pixel signals, readout lines and accumulation start lines satisfying:

readout area start line readout line readout area end line; and readout area start line accumulation start line readout area end line, where readout line =accumulation start line-count number.

25. The method according to claim 23, wherein, in a case where the accumulation time is equal to or longer than the readout time for reading out all the readout object pixel signals, the count number is calculated based on the accumulation time and the skip unit, and, in a case where the accumulation time is shorter than the readout time, the count number is calculated based on the accumulation time and a number of readout object lines of the readout area.

26. The method according to claim 22, wherein:

the set readout condition comprises at least one readout area as a readout object of the image sensor;

the count number is calculated based on readout time per unit line of the at least one readout area; and the skip line is set based on the at least one readout area and the count number.

27. The method according to claim 22, wherein the controlling includes starting, in a case where the accumulation time is equal to or longer than readout time for reading out all readout object pixel signals, accumulating of a readout object line and readout of a line next to the readout object line after readout from the readout object line of the image sensor is ended, and starting, in a case where the accumulation time is shorter than the readout time for reading out all the readout object pixel signals, accumulating of the readout object line of the image sensor, and then reads out the readout object line in a case where accumulating of a line, which is after the count number from the readout object line, is started.

28. The method according to claim 22, wherein a skip line is set concerning readout in a case where the accumulation time is equal to or longer than time for reading out all readout object pixel signals, and a skip line is set concerning an accumulation start and readout in a case where the accumulation time is shorter than the readout time.

* * * * *